United States Patent
Rittenhouse

(10) Patent No.: US 8,183,726 B2
(45) Date of Patent: *May 22, 2012

(54) ELECTRIC MOTOR ASSIST BICYLE

(76) Inventor: Norman Rittenhouse, Fairbury, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/112,306

(22) Filed: May 20, 2011

(65) Prior Publication Data

US 2011/0285328 A1 Nov. 24, 2011

Related U.S. Application Data

(60) Continuation-in-part of application No. 12/784,690, filed on May 21, 2010, which is a continuation-in-part of application No. 12/486,957, filed on Jun. 18, 2009, now Pat. No. 7,868,510, which is a continuation-in-part of application No. 12/371,823, filed on Feb. 16, 2009, now Pat. No. 7,723,891, which is a division of application No. 11/731,427, filed on Mar. 30, 2007, now Pat. No. 7,492,074.

(51) Int. Cl.
*H02K 3/04* (2006.01)
*H02K 3/26* (2006.01)
*H02K 29/06* (2006.01)
*H02K 29/08* (2006.01)

(52) U.S. Cl. ........ 310/68 R; 310/257; 310/267; 310/268

(58) Field of Classification Search ............... 310/75 C, 310/216.069, 257, 267, 268, 68 R, 68 B; 180/65.26, 65.285, 65.8, 181, 206.2, 206.4, 180/206.5, 220, 214

See application file for complete search history.

(56) References Cited

U.S. PATENT DOCUMENTS

| | | | | |
|---|---|---|---|---|
| 3,991,843 A * | 11/1976 | Davidson | ................... | 180/206.1 |
| 4,122,907 A * | 10/1978 | Davidson et al. | .......... | 180/206.3 |
| 4,168,758 A * | 9/1979 | Holt | ........................... | 180/206.7 |
| 5,226,501 A * | 7/1993 | Takata | ....................... | 180/206.2 |
| 5,370,200 A * | 12/1994 | Takata | ....................... | 180/206.4 |
| 6,814,172 B1 * | 11/2004 | Vu | ................................ | 180/220 |
| 7,108,097 B1 | 9/2006 | Bolton | | |
| 7,492,074 B1 * | 2/2009 | Rittenhouse | .................. | 310/265 |
| 7,579,742 B1 * | 8/2009 | Rittenhouse | .................. | 310/257 |
| 7,723,891 B2 * | 5/2010 | Rittenhouse | .......... | 310/216.023 |
| 7,868,510 B2 * | 1/2011 | Rittenhouse | .......... | 310/216.069 |
| 2003/0047369 A1 | 3/2003 | Katagiri | | |
| 2003/0074985 A1 | 4/2003 | Liao | | |
| 2004/0119345 A1 | 6/2004 | Takano | | |
| 2007/0222170 A1 | 9/2007 | Sasnowski | | |
| 2007/0252452 A1 * | 11/2007 | Ishimoto et al. | ............ | 310/67 A |
| 2009/0322165 A1 | 12/2009 | Rittenhouse | | |

* cited by examiner

*Primary Examiner* — Tran Nguyen
(74) *Attorney, Agent, or Firm* — Brian S. Steinberger; Phyllis K. Wood; Law Offices of Brian S. Steinberger, P.A.

(57) ABSTRACT

Methods, systems and apparatus for an electric motor assist bicycle having a hub motor mounted to the front or rear hub to provide electric motor assist, and to function as a generator to charge batteries. The motor can be either a molded or wound magnetic flux channel transverse wound stator permanent magnet motor. The bicycle hub motor includes an electronic controller mounted to the frame of the bicycle and coupled with feedback electronics for monitoring a timing, speed and direction and coupling a signal to a processing unit for adjusting the drive electronics driving the phase windings. The pedal crank arm housing of the electric motor assist bicycle can include battery access ports with batteries stacked inside the bicycle seat tube and the down tube and a strain gauge to measure the rider pedaling effort and produce a signal in response.

27 Claims, 17 Drawing Sheets

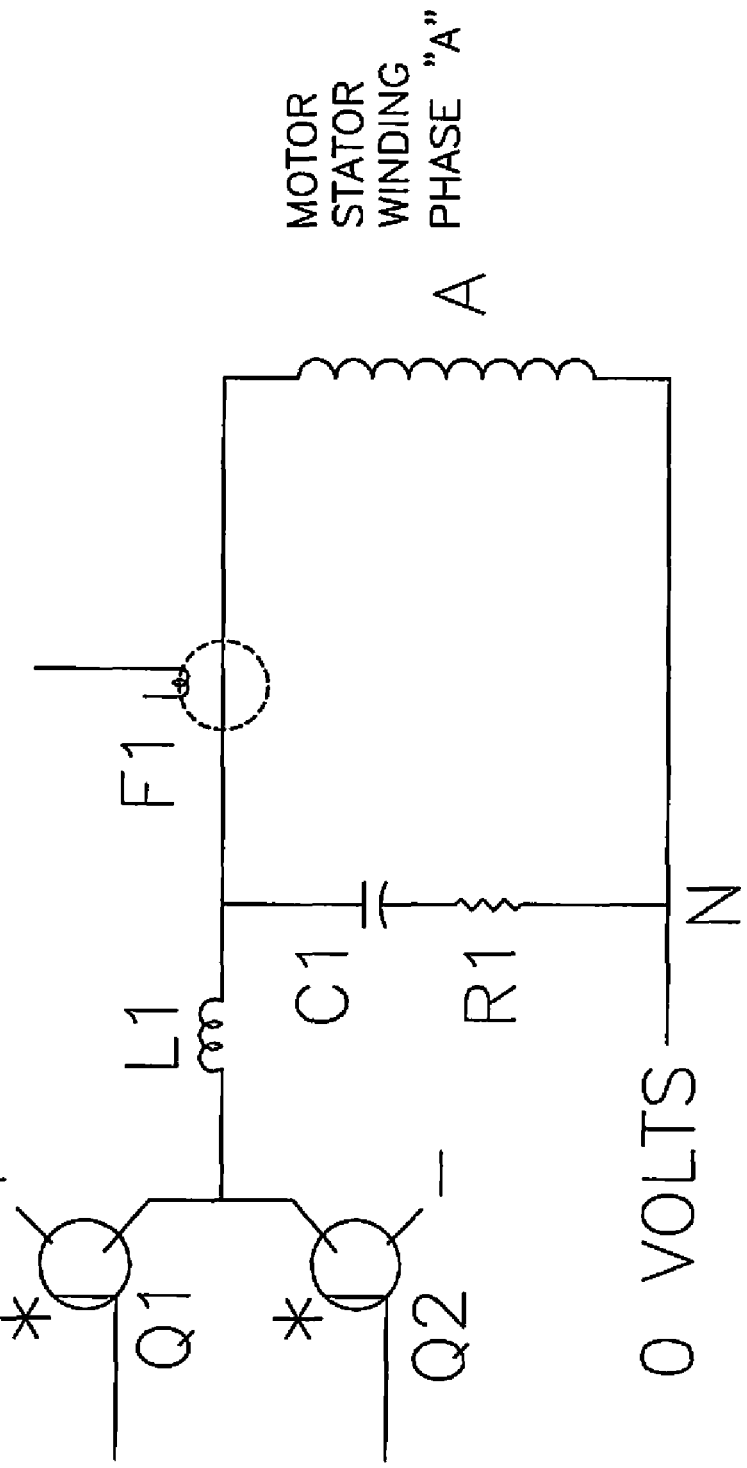

ELECTRIC MOTOR ASSIST BICYLE

This application is a continuation-in-part of U.S. application Ser. No. 12/784,690 filed on May 21, 2010 which is a continuation-in-part of U.S. application Ser. No. 12/486,957 filed on Jun. 18, 2009, now U.S. Pat. No. 7,868,510, which is a continuation-in-part of U.S. application Ser. No. 12/371,823 filed on Feb. 16, 2009, now U.S. Pat. No. 7,723,891, which is a divisional application of U.S. application Ser. No. 11/731,427 filed on Mar. 30, 2007, now U.S. Pat. No. 7,492,074.

FIELD OF THE INVENTION

This invention relates to motorized bicycles and, in particular, to methods, systems, devices and apparatus for an electric motor assist bicycle having a hub motor mounted to the front or rear hub to provide electric motor assist, and to function as a generator to charge batteries, the motor being one of a molded or wound magnetic flux channel transverse wound stator permanent magnet motor.

BACKGROUND AND PRIOR ART

As early as 1903, motorized bicycles were being fitted with larger and heavier loop frames designed to specifically accommodate larger displacement engines, which produced higher speeds. These new motorbike frame designs soon incorporated a new riding position which no longer centered the rider over the pedals, but instead moved the rider's feet forward, where they rested on pegs or platforms. The new riding position was designed to increase rider comfort and control when using the motor for propulsion, and soon owners began relying on the gasoline motor for all but emergency use. Front suspension and (on some machines) rear suspension increased control at high speeds. By 1915, some manufacturers were omitting pedal propulsion entirely, resulting in the introduction of the first true modern motorcycle.

Derny motor-pacing cycle is a motor mounted in a frame, with drive via the chain to the rear wheel. Many years later, manufacturers would re-introduce this concept as the moped, a small motorcycle fitted with pedals that can be used as a starting aid but which cannot, practically, be ridden under pedal power alone. In France, the gasoline-powered motorized bicycle was popular during the 1930s, and continued to be widely sold in early postwar years as a means of transportation during a period of gasoline shortages and limited automobile production.

In the 1930s, the "clip-on" motors were developed for bicycles (35 to 49 cc), followed by the "Autocycle" with a purpose-built frame incorporating pedals and a two-stroke engine, but without a gearbox. In 1939, the American bolt-on Whizzer gas-engined bicycle kit was introduced, utilizing a 138 cc side-valve four-stroke engine and belt drive. In the United Kingdom, the motorized bicycle saw a resurgence of popularity and such bolt-on motors as the Cyclaid and the Cyclemaster motor wheel had brief periods of immense popularity. The Cyclemaster, which was a hub motor which could be fitted to an ordinary bike, started at 25 cc, but later the size went up to 32 cc.

During the 1960s, the moped craze arrived in the United States, the United Kingdom, and other countries. Mopeds had been produced for years in France and Italy, but were largely unknown in other countries. The moped's surge in popularity was motivated by the arrival of new machines which could be operated without a driving license and with a minimum of effort to meet existing regulation by the authorities. The new moped designs were really low-powered motorcycles, equipped with pedals largely to meet legal requirements. Most could only be pedaled with difficulty over short distances on level ground.

Motorized bicycles are still being developed both as complete designs and as add-on motor kits for use on standard bicycles, either by part-time hobbyists or by commercial manufacturers. With the development of new, lighter, and more powerful batteries, electric motors for power assist are increasingly popular, often using hub motors to facilitate after-market conversions. Converting bicycles or tricycles has proven useful for some people with physical disabilities such as knee injury or arthritis.

Currently there are several U.S. companies manufacturing aftermarket internal combustion engine (ICE) motor conversion kits for conventional bicycles. These include both four-stroke and two-stroke gasoline engine designs. Among these companies include a rear-engine (rack-mounted) kit using a belt to drive the rear wheel or a rack-mount with a either a tire roller-mount (friction drive) or a chain-driven, geared transmission. Other manufacturers produce kits using small two- or four-stroke gas engines mounted in the central portion of the bicycle frame, and incorporating various types of belt- or chain-driven transmissions and final drives.

Motorized bicycles using electric motors have also re-entered the market. Electrically-powered bicycles use batteries, which have a limited capacity and thus a limited range, particularly when large amounts of power are utilized. This design limitation means that the use of the electric motor as an assist to pedal propulsion is more emphasized than is the case with an internal combustion engine.

While costly, new types of lithium batteries along with electronic controls now offer users increased power and range while reducing overall weight. Newer electric motor bicycle designs are gaining increasing acceptance, particularly in countries where increasing traffic congestion, aging populations, and concern for the environment have stimulated development and usage. Concurrently, bicycles have become an excellent form of exercise, ranging from stationary bicycles used in "spinning classes", mountain bicycles for off road riding and street and beach bicycles. However, the range of the bicycle ride is determined by the terrain and the physical condition of the rider.

To improve the range, the methods, systems, devices and apparatus of the present invention provides an electric motor assist bicycle having a hub motor mounted to the front or rear hub to provide electric motor assist. The bicycle hub motor can be a molded or wound magnetic flux channel transverse wound stator permanent magnet motor connected to rechargeable batteries to provide electric motor assistance to the rider during travel and operating as a generator to recharge the batteries.

SUMMARY OF THE INVENTION

A primary objective of the invention is to provide methods, systems, devices and apparatus for a bicycle hub motor in which plural stators are composed of wire wound or molded magnetic flux channels for an electric motor assist bicycle.

A secondary objective of the invention is to provide methods, systems, devices and apparatus for a bicycle hub motor in which all electronics except the Hall sensors are contained outside of the motor in a compartment attached to the frame to allow for easy replacement of electronics without disassembly of the motor.

A third objective of the invention is to provide methods, systems, devices and apparatus for a bicycle hub motor with a standard axle, motor width, and spoke placement to allow installation on a standard bicycle A fourth objective of the invention is to provide methods, systems, devices and apparatus for a bicycle hub motor mounted on the rear hub of a two wheel bicycle or mounted on the front wheel of two of three wheeled bicycles.

A fifth objective of the invention is to provide methods, systems, devices and apparatus for a bicycle hub motor that includes a threaded flange to install a chain sprocket assembly or a belt pulley assembly.

A sixth objective of the invention is to provide methods, systems, devices and apparatus for a bicycle hub motor connected with rechargable batteries that can be stored inside of the frame down tube with access ports in the crank arm housing.

A seventh objective of the invention is to provide methods, systems, devices and apparatus for a bicycle hub motor that includes a deflection measuring strain gauge in the crank arm housing to measure the rider's pedaling effort to allow the electronics to proportionally power the hub motor to assist the rider.

An eighth objective of the invention is to provide methods, systems, devices and apparatus for a bicycle hub motor having a very high efficiency, light weight molded or wound magnetic flux channel transverse wound stator permanent magnet motor/generator with rechargeable batteries.

A ninth objective of the invention is to provide methods, systems, devices and apparatus for a high efficiency direct drive high torque motor/generator constructed to reduce the weight when connected with rechargeable batteries for attachment to a bicycle frame as an electric assist bicycle.

A tenth objective of the invention is to provide methods, systems, devices and apparatus for a very high efficiency direct drive high torque motor/generator with an inside stator assembly having a ring of wound magnetic flux channel pole pieces.

An eleventh objective of the invention is to provide methods, systems, devices and apparatus for a high efficiency direct drive high torque motor/generator constructed using a wire wound or molded magnetic flux channels pole pieces having a shape with an axial slot to accommodate the rotor permanent magnet and an air gap.

A first embodiment of the invention provides an electrical assist bicycle that includes a parallel pole direct drive motor mounted to a hub of a bicycle to provide electric motor assist, the parallel pole direct drive motor, rechargeable batteries connected with the electric parallel pole direct drive motor and an electronic controller mounted to the frame of the bicycle connected with the sensors and the rechargeable battery to measure and proportion electrical power to the motor, the parallel pole direct drive motor coupling the feedback signal to a processing unit for determining and adjusting a drive electronics for driving the transverse phase windings and generating an electrical energy to recharge the rechargeable battery. The bicycle hub motor includes an outside rotor having a rotor disc with plural magnets having alternating polarities flush mounted into the rotor disc, an inside stator assembly having a ring of magnetic flux channel pole pieces corresponding to a phase of the motor attached with a housing for a transversely wound stator windings to capture and focus the magnetic flux emanating from the transverse winding and channel the magnetic flux to the ring of magnetic flux channel pole pieces, and a sensor for monitoring a timing, speed and direction and for producing a feedback signal.

The ring of magnetic flux channel pole pieces can be a ring of wound wire magnetic flux channel pole pieces corresponding to a phase of the motor, each pole piece body having a u-shaped gap above the bobbin to receive the rotor disc and inserted magnets with a gap therebetween and cut to form the u-shaped gap to direct and focus the captured magnetic flux toward and delivering the captured magnetic flux to the flat, axial magnetic pole surfaces with parallel sides of the u-shaped gap, perpendicular magnetic lines of force emanating at the pole piece surfaces. The wound magnetic flux channel pole pieces can be plural layered strands of insulated wire or amorphous tape to carry flux away from the wound pole pieces.

Alternatively, the ring of magnetic flux channel pole pieces can be a ring of plural molded magnetic flux channel pole pieces corresponding to a phase of the motor forming a hollow channel for housing a transversely wound stator winding to capture and focus the magnetic flux emanating from the transverse winding and channel to the plural pole pieces, each pole piece body having a u-shaped gap above the channel to receive the rotor disc and inserted magnets with a gap therebetween and formed with tapered exterior sides and radiused curves in the base of the u-shaped gap to direct and focus the captured magnetic flux toward and delivering it to the flat, axial magnetic pole surfaces with parallel sides of the u-shaped gap, perpendicular magnetic lines of force emanating at the pole piece surfaces. In this embodiment, each one of the plural molded magnetic flux channel pole pieces includes two pole pieces mated to form the channel connected at the base of the channel and have an isolation gap above the channel and the u-shaped gap above the isolation gap and the rotor disc can be plural rotor discs separated by rotor disc spacers to form the outside rotor.

The electric bicycle hub motor includes plural cascaded Hall effect sensors located near the path of the rotor permanent magnets to generate a stair step sine wave which conveys information on rotor speed, direction, and timing to the electronic controller, and for generating an output waveform for driving the parallel pole direct drive motor. The electrical assist bicycle can have side plates that form a band around the parallel pole direct drive motor, the band holding the side plates in compression and drilled for installation of spokes to alleviate the need for through fasteners and the side plates can include a threaded flange to install a chain sprocket assembly or a belt pulley assembly.

The stator assembly can be used to recharge batteries when decelerating or riding downhill, the cylindrical rechargable batteries can be stacked together for placement within the down tube or seat tube of the bicycle frame, and a battery terminal lead connected at one end with the stack of rechargable batteries can be routed through the crank arm housing to the electronic controller to minimize connective losses and to improve the appearance of the bicycle. There can be a battery access port in the bicycle crank arm housing for installing and removing the stack of rechargeable batteries which can have weatherproof access covers for the crank arm housing. A longitudinal spring can be used to hold the cylindrical battery stack in contact with the interior wall of the down tube or seat tube to increase heat dissipation and reduce rattling and the batteries can be in a tubular housing to hold the stack of rechargable batteries or have shrink wrap material wrapped around the stack of rechargeable batteries to insulate, protect and maintain the shape of the stack of rechargeable batteries.

The electrical assist bicycle can include a strain gauge connected to a bicycle crank arm housing to measure a rider pedaling effort and a waterproof, flexible plug cover for the battery access port to permit controlled flexing of the crank arm housing for the strain gauge to measure a rider pedaling effort.

The electric assist bicycle can also include an electrical plug in the controller electronics for attaching a battery charger to recharge the rechargeable batteries.

Further objects and advantages of this invention will be apparent from the following detailed description of preferred embodiments which are illustrated schematically in the accompanying drawings.

BRIEF DESCRIPTION OF THE FIGURES

FIG. 15 shows an embodiment including LRC filters in an output circuit that filter out the high frequency semiconductor switching frequency without the over-running fly-forward diodes.

DESCRIPTION OF THE PREFERRED EMBODIMENTS

Figure 1:
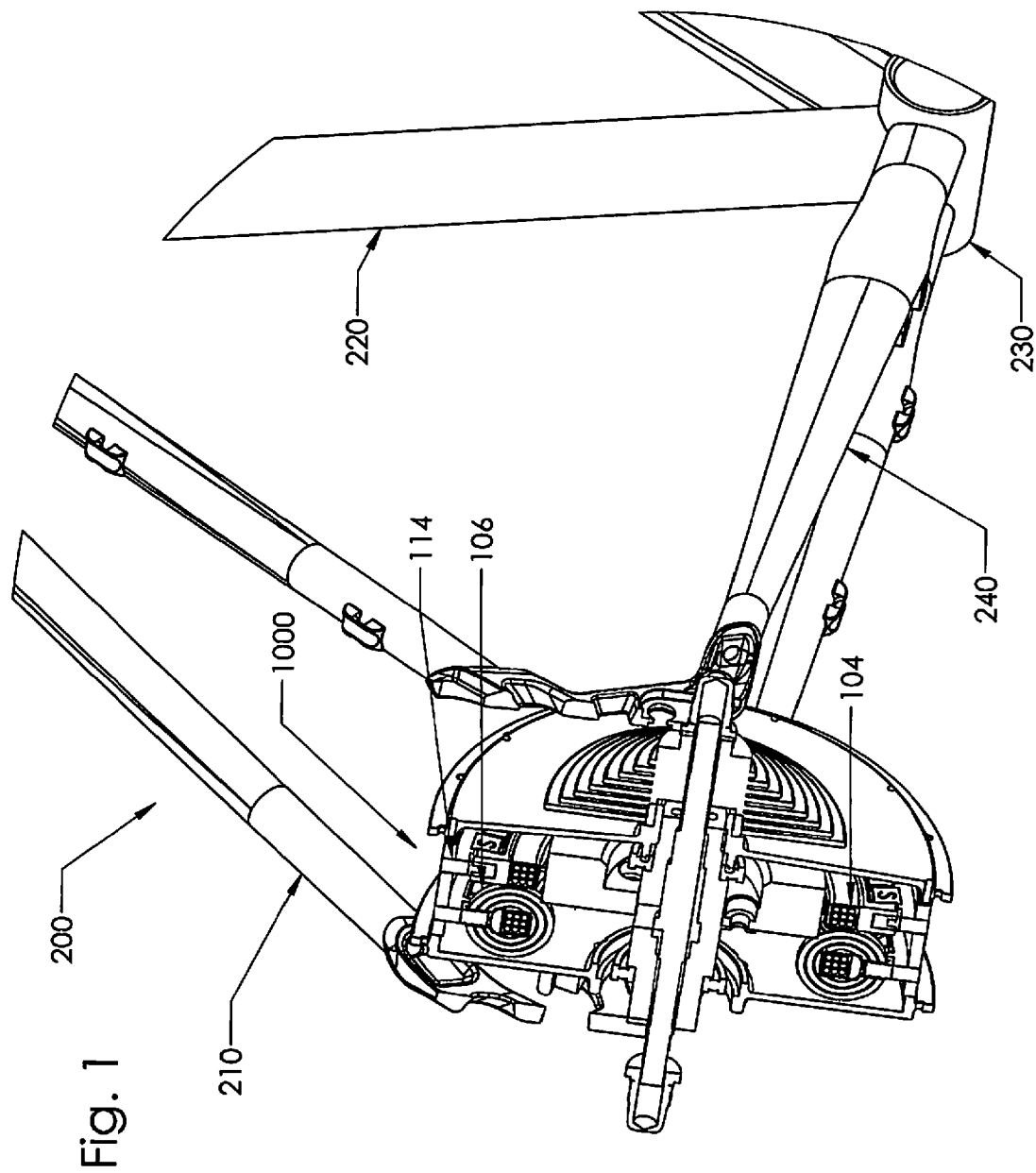
FIG. 1 is a cross sectional view of the wire would magnetic flux channels of the bicycle hub motor mounted on the rear axle according to one embodiment of the invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | | | |
|---|---|---|---|
| 1000 | bicycle hub motor | | |
| 100 | inert stator form | 230 | crank arm housing |
| 101 | tooth/teeth | 240 | chain stay |
| 102 | alignment hole | 250 | down tube |
| 103 | assembled winding bobbin | 255 | down tube access |
| 104 | transverse winding | 257 | access plug |
| 105 | winding bobbin | 260 | steering head |
| 106 | wound magnetic flux channels | 270 | strain gauge |
| 110 | hub | 275 | strain gauge wiring |
| 112 | pole piece | 300 | battery |
| 120 | hub | 310 | spring |
| 130 | motor-electronic wiring | 320 | battery interface wiring |
| 200 | bicycle frame | 330 | spacer spring |
| 210 | rear fork/seat stay | 400 | control electronics |
| 220 | seat tube | 1120 | transverse winding |
| 225 | seat tube access | 1130 | permanent magnets, phase A |
| 1132 | permanent magnets, phase B | 1190 | epoxy filler |
| 1134 | permanent magnets, phase C | 1210 | pole pieces, phase A |
| 1140 | mounting shaft | 1220 | pole pieces, phase B |
| 1145 | bearing | 1230 | pole pieces, phase C |
| 1148 | splined surface | 1810 | detector module |
| 1160 | rotating disc | 1820 | controller |
| 1160a | rotating disc, phase A | 1822a | timing look up table |
| 1160b | rotating disc, phase B | 1822b | waveform look up table |
| 1160c | rotating disc, phase C | 1824 | acceleration/deceleration table |
| 1165 | end plate | 1826 | transistors |
| 1170 | alignment key | 1828 | LRC filter |
| 1180 | spacer | 1830 | magnet |

The present invention is a continuation-in-part of U.S. application Ser. No. 12/784,690 filed on May 21, 2010 which is a continuation-in-part of U.S. application Ser. No. 12/486,957 filed on Jun. 18, 2009, now U.S. Pat. No. 7,868,510, which is a continuation-in-part of U.S. application Ser. No. 12/371,823 filed on Feb. 16, 2009, now U.S. Pat. No. 7,723,891, which is a divisional application of U.S. application Ser. No. 11/731,427 filed on Mar. 30, 2007, now U.S. Pat. No. 7,492,074, all by the same inventor and which are all incorporated herein by reference.

Figure 3A:
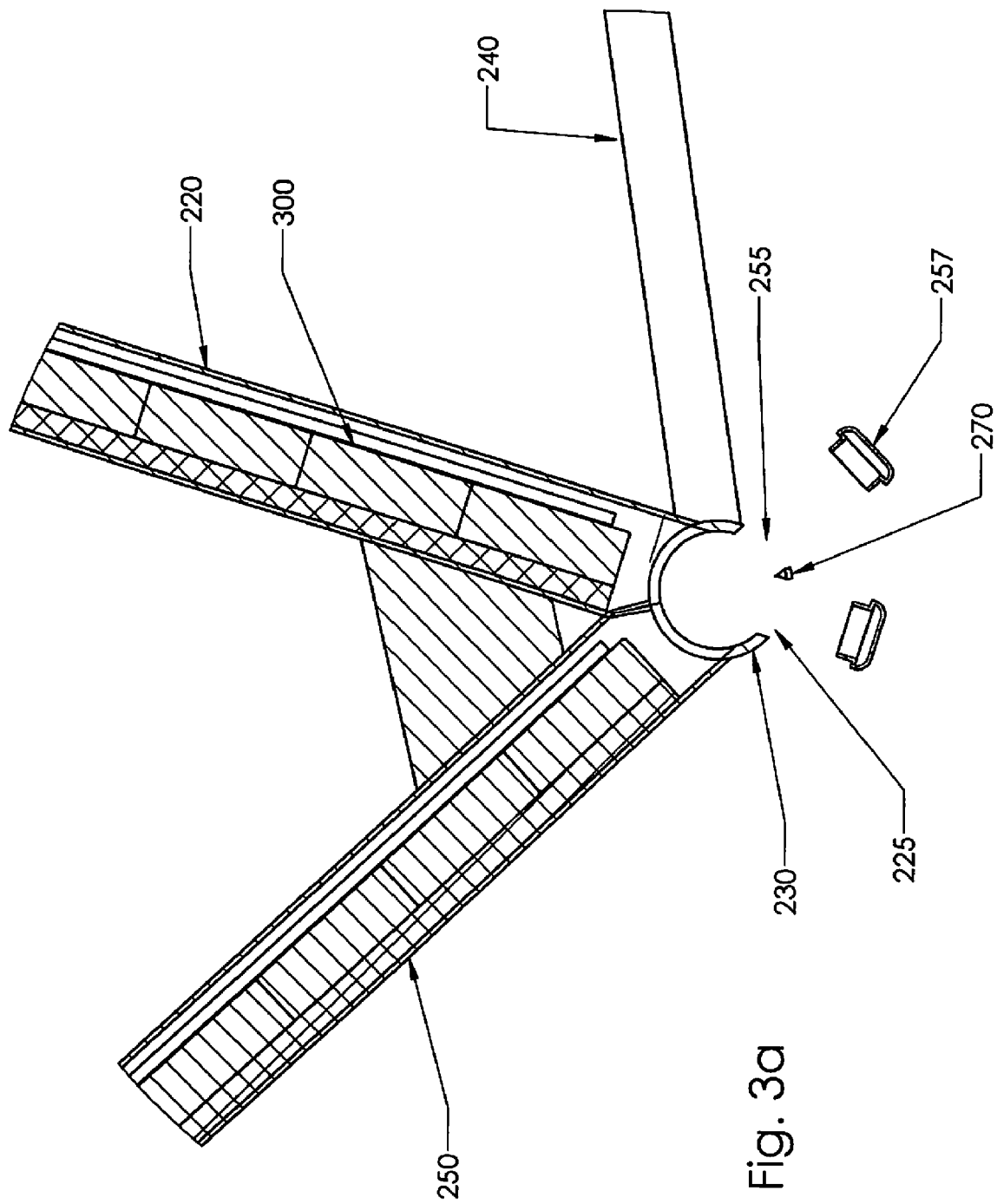
FIG. 3a is another cross sectional side view of the pedal crank arm housing showing a strain gauge mounted on the housing to measure the rider's pedaling effort.
Figure 4:
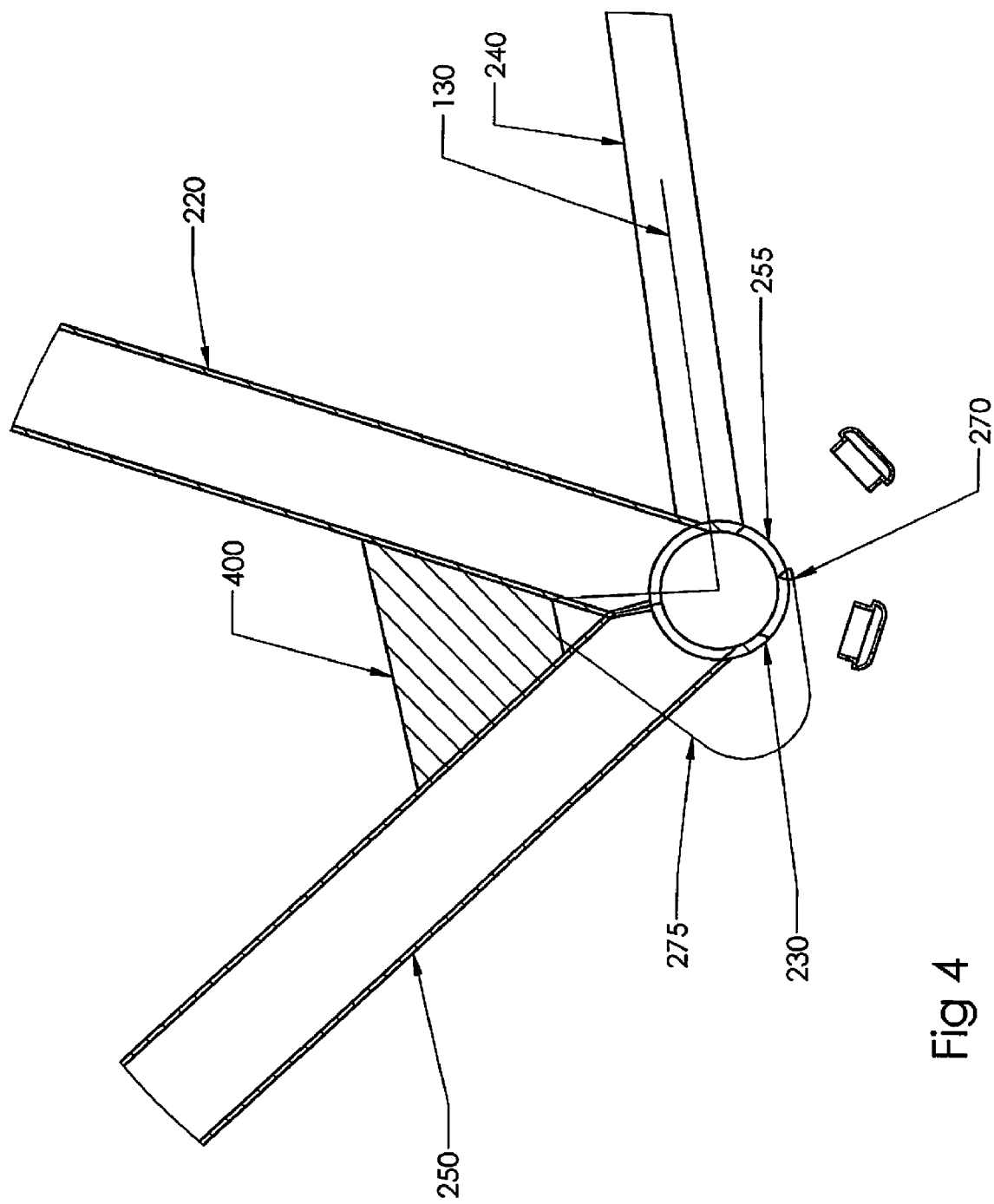
FIG. 4 is yet another cross sectional side view of the pedal crank arm housing showing the wiring between the hub motor, the electronic compartment and the batteries.

A typical bicycle has two wheels and a pair of rotatable pedals, and is propelled by a rider via the pedals. The methods, systems, devices and apparatus of the present invention provide a motor assist bicycle that includes an electric hub motor 1000, rechargeable batteries 300 and an electronic controller 400 as shown in FIGS. 3a and 4. The bicycle hub motor is designed for a standard axle bicycle. The motor width and the spoke placement allow installation of the bicycle hub motor on a standard bicycle as shown in FIG. 1. In a preferred embodiment the bicycle hub motor is a three phase motor although the motor shown in FIG. 1 is a two phase motor. The bicycle hub motor can include a threaded flange (not shown) to install a chain sprocket assembly or a belt pulley assembly.

The bicycle hub motor 1000 can be mounted to the front or rear axle of the bicycle to provide electric motor assist to deliver power for assisting the driving force of the bicycle. In a preferred embodiment, the stator is also used as a generator to recharge batteries. The bicycle hub motor 1000 is mounted with the axle of the rear wheel in the preferred embodiment to "push" the bicycle as shown in FIG. 1. However, the bicycle hub motor can be mounted with the axle of the front wheel. In the front heel mount embodiment, flexible wiring can be routed through the front fork to the handle bar head tube and through the down tube to the control electronics 400 shown in FIG. 2*a*. When the bicycle is a three wheel bicycle, the bicycle hub motor is mounted to drive the front axle.

In an embodiment, the side plates of the bicycle hub motor form a band which is drilled for the installation of spokes. The band holds the two side plates in compression and alleviates the need for fasteners. In an alternative preferred embodiment, the side plates of the bicycle hub motor can be bonded to the magnet housing or magnet carriers to eliminate the need for internal fasteners, which also reduces the weight.

Figure 2A:
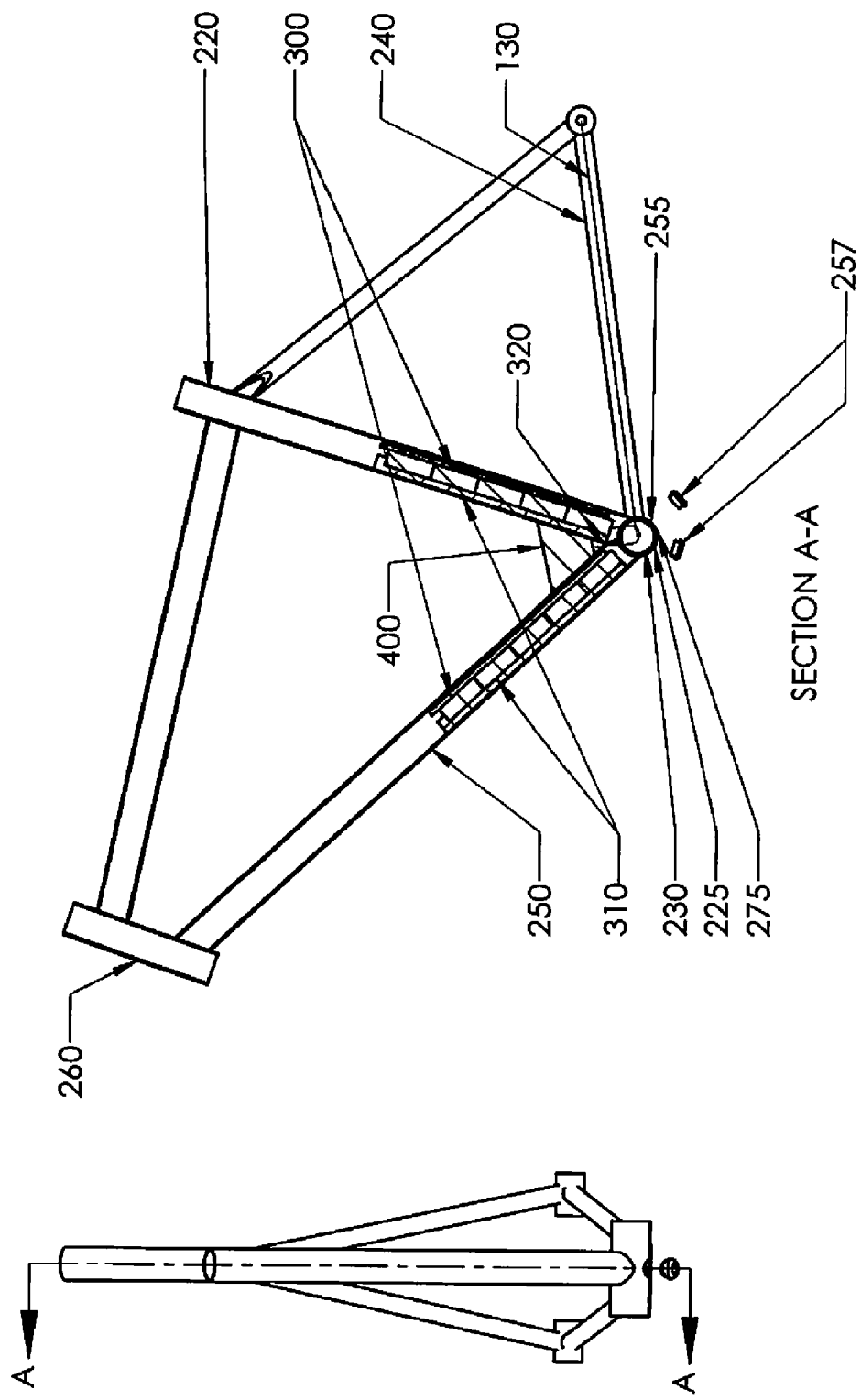
FIG. 2a is a cross sectional side view of the pedal crank arm housing showing the battery access ports and batteries stacked inside the bicycle seat tube and the down tube.

The bicycle hub motor electronics 400, except the Hall sensors 1810 (FIG. 12), are contained outside of the motor in a compartment at the bottom bracket of the bicycle to allow for easy replacement of electronics without disassembly of the motor. In a preferred embodiment the electronics compartment can be a triangular compartment that can be mounted between the seat stay and the down tube of the bicycle frame as shown in FIG. 2*a*. When the motor is mounted to the rear hub, the electrical wiring 130 is routed through the chain stay 240 and crank arm housing 230 as shown in FIG. 4 to the electronic compartment 400 to minimize the resistive losses in the wiring. Alternatively, the triangular housing for the electronics can be adjacent to the head tube of front wheel drive bicycles (not shown).

Rechargeable batteries 300 are preferably housed in the bicycle frame down tube 250 as shown in FIG. 3*a*. The battery storage compartment can include access ports 225 and 255 in the pedal crank arm housing 230 to allow the batteries to be installed inside the frame down tubes without access doors in the down tube itself which would weaken the frame. As previously described, the motor stator coils can be used as a generator to recharge the battery when decelerating or riding downhill.

To increase the range of the motor assist, the rechargeable batteries 300 are housed in the lower portion of both the seat tube 220 and the down tube 220 as shown in FIG. 3*a* to lower the bicycle's center of gravity and increase the power available between charges. For improved performance, the rechargeable battery placement can be selected to distribute the weight between the front and rear of the bicycle frame. Installing the batteries in the bicycle frame tubes eliminates the need to add additional frame members to mount a separate battery storage unit. The storage of the batteries in the bicycle frame also reduces weight, wind resistance and improves the overall appearance of the bicycle.

Figure 2B:
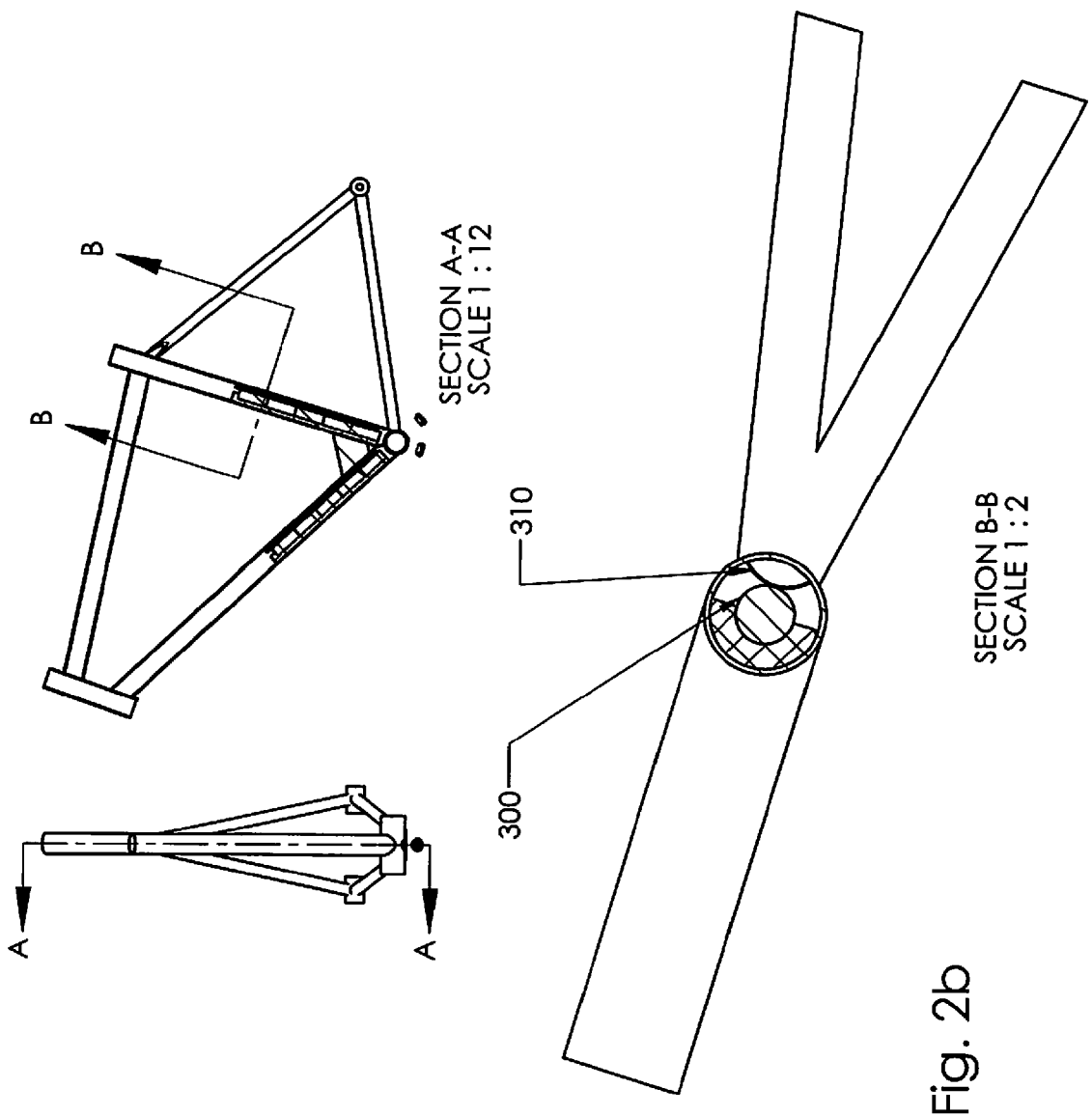
FIG. 2b is a cross sectional view of a battery in a tube of the bicycle frame with a longitudinal spring holding the battery in place.

When the batteries 300 are installed within the frame tubes, the batteries can be shrink wrapped and a longitudinal spring 310 can be used to hold a cylindrical battery stack in contact with the interior wall of the bicycle frame tube as shown in FIG. 2*b* to increase heat dissipation and to reduce rattling. The battery terminal leads can be routed through the crank arm housing 230 directly to the electronics compartment 400 as shown in FIG. 2*a* to minimize connective losses and to improve the appearance of the bicycle. Battery access ports 255 and 225 for the down tube and or the seat tube, respectively, can be provided in the crank arm housing 230 as shown in FIG. 2*a* and the access ports can be covered with waterproof, flexible plugs 257 to permit controlled flexing of the crank arm housing 230 with rider pedaling effort.

Figure 3B:
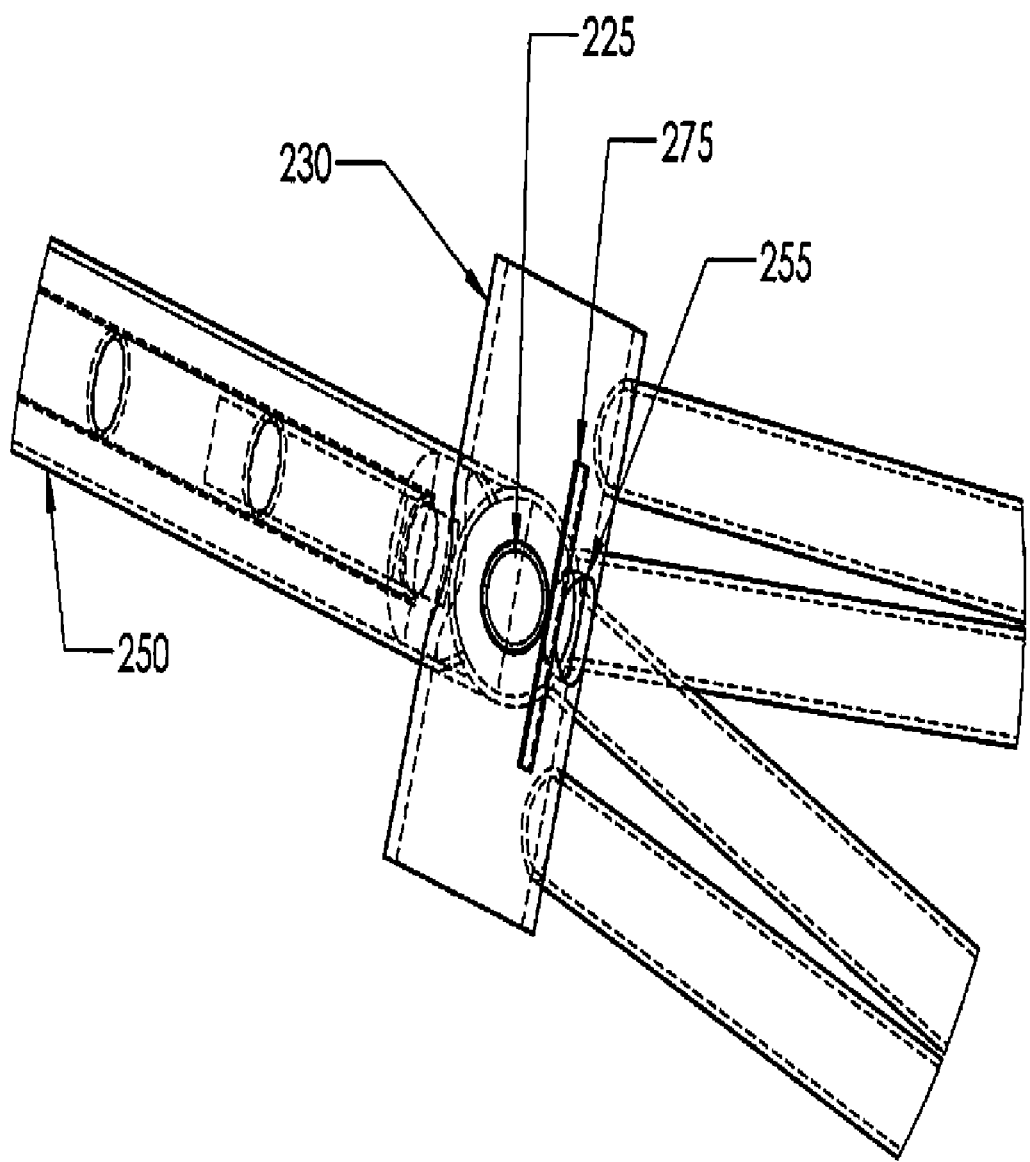
FIG. 3b is a top cross sectional view of the pedal crank arm housing showing the battery access ports and the strain gauge.

As shown in FIG. 3*a*, the electric motor assist bicycle can be equipped with a strain gauge 270 to measure the rider pedaling effort and produce a signal that is transmitted to the control electronics 400. The orientation of the stressed conductors is aligned to measure the crank housing stresses caused by the rider's pressure on the pedals. FIG. 3*a* is a cross sectional side view of the crank arm housing 230, seat tube 220 and down tube 250 showing the positioning of the strain gauge 270 between the battery access ports 225 and 255. FIG. 3*b* is a top cross-sectional view of the crank arm housing 230 showing the battery access ports 225, 255 and the location of the strain gauge 270 wiring. The deflection measuring strain gauge 270 in the crank arm housing 230 is used to measure the bicycle rider's pedaling effort to allow the control electronics 400 to proportionally power the bicycle hub motor 1000 to assist the rider. In a preferred embodiment, the compressive area between the battery access ports 225, 255 in the crank housing 230 is instrumented to measure the chain wheel pressure on the supporting crank bearings.

The cross sectional side view in FIG. 4 shows the wiring between the strain gauge 270 and batteries 300 and the electronic controller 400. The wiring between the bicycle hub motor 1000 and the electronic controller 400 is routed through the chain stay 240 and passes through the crank arm housing 230 to the electronic controller 400 to minimize signal loss and contamination.

When a bicycle hub motor is being retrofit to an existing bicycle frame, an external battery compartment can be attached to the bicycle frame or be mounted above the rear fender in a manner similar to mounting a storage compartment on the rear bicycle rack above the rear fender. In the retrofit embodiment, the electronic compartment 400 can be mounted between the seat tube and the down tube with wiring externally routed along the seat tube to the external battery compartment and along the chain stay to the hub motor. Although this is the preferable location for mounting the electronic controller, it is understood that the electronic controller can be included with the external battery compartment or be mounted between the seat stay and the top tube or the top tube and the down tube without departing from the scope of the invention.

As shown in FIG. 1, in a first preferred embodiment, the bicycle hub motor include wire wound flux channels. The wire wound flux channels can be potted in a prepreg high temperature epoxy and cured in an oven. In this embodiment, the bicycle hub motor is a high efficiency direct drive high torque motor utilizing wound magnetic flux channel pole pieces composed of layered strands of insulated iron or other similar wire, or amorphous tape as described in U.S. patent application Ser. No. 12/784,690 filed on May 21, 2010 by the inventor of the subject application and which is incorporated herein by reference. The motor can be configured for both a three stator motor or a single stator motor and includes simplified building blocks for construction of the motor. In a preferred embodiment, the bicycle hub motor is a three phase motor.

Figure 5:
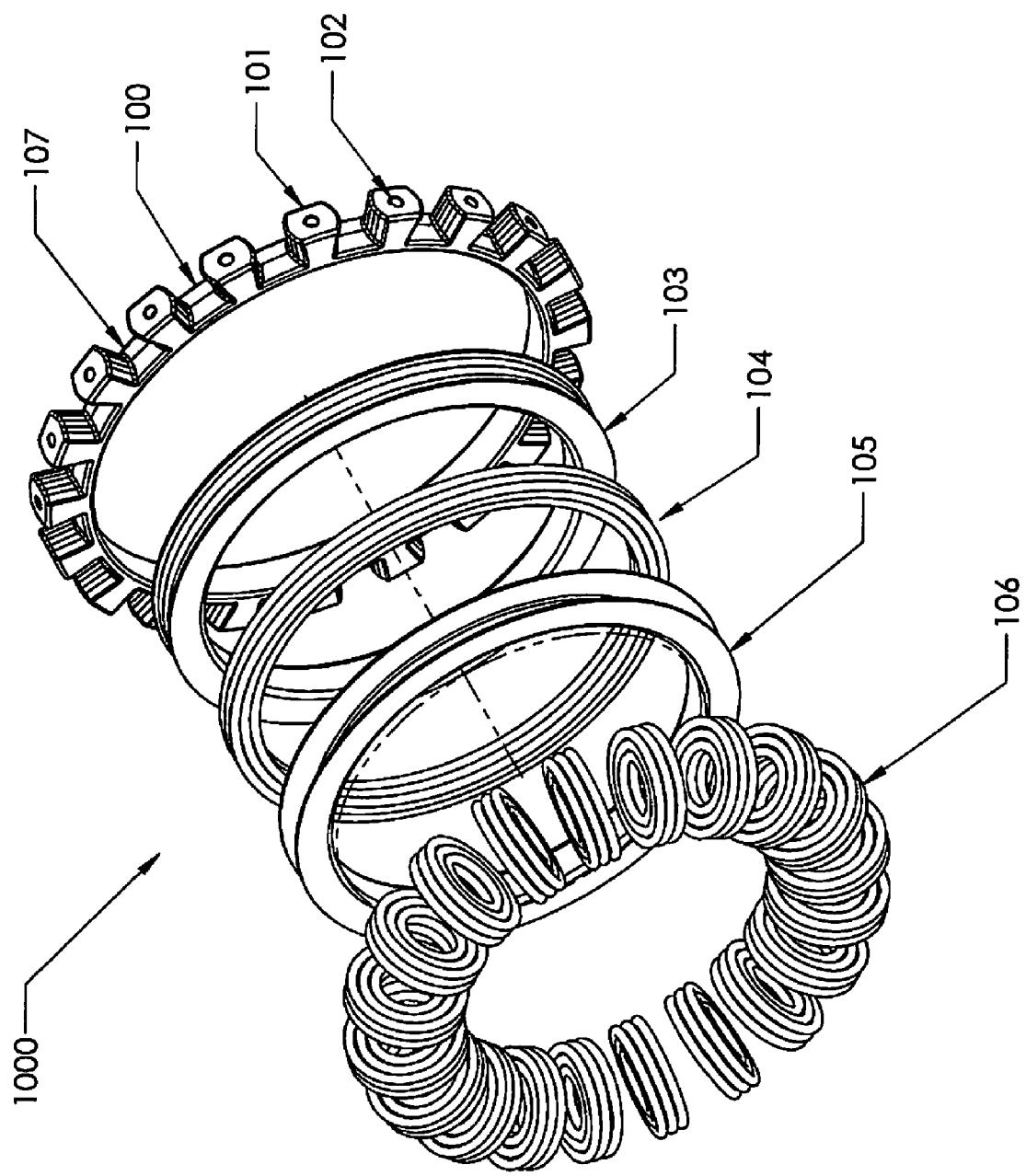
FIG. 5 is an exploded view of the four main components of the wound magnetic flux channel stator according to the present invention.

FIG. 5 is an exploded view of the four main components of the wound magnetic flux channel stator. As shown, the parallel pole motor 1000 includes four main parts—the inert stator form 100, the coil bobbin 105, the transverse coil winding 104, and the wound magnetic flux channel 106 composed of layered strands of insulated iron or other similar wire, or amorphous tape.

In the stator of the present invention, the transverse wound coil winding 104 is wound on a close fitting coil winding bobbin 105, using conventional or automated coil winding machinery to produce the assembled bobbin 103. After the transverse coil winding 104 is wound on the coil bobbin 105, the completed coil bobbin 103 with its winding are bonded to the inner surface of the final inert stator form 100. As shown in FIG. 5, the inert stator form 100 can be composed of an inner rim 107 with teeth 101 protruding from the inner rim that correspond to the spaces between the pole pieces to be wound on the inert stator form 100 with the assembled transverse coil 104 in its bobbin 105 as shown in FIG. 6 as an assembled bobbin.

Figure 6:
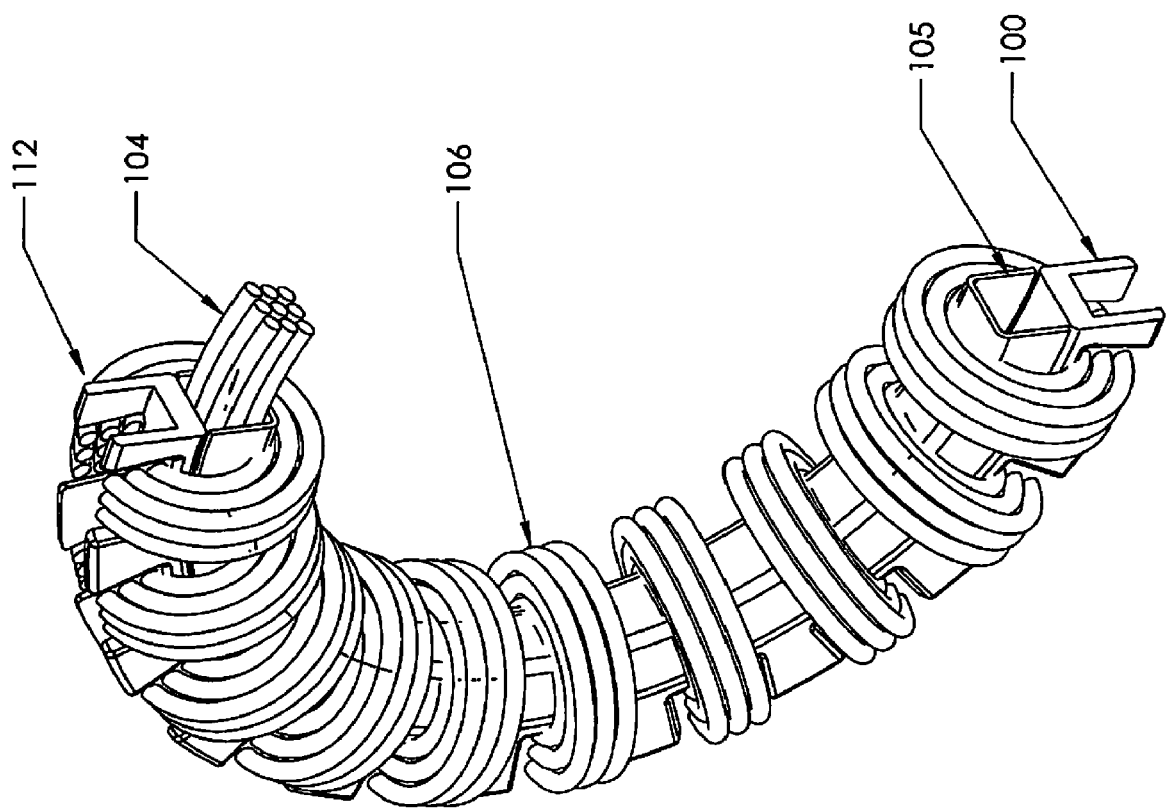
FIG. 6 is a cutaway side view of the fully wound stator of FIG. 4 showing the transverse winding.

FIG. 6 is a cutaway side view of the fully wound stator after the magnetic pole surfaces 112 have been cut, showing the internal parts of the assembly. As shown, the transverse winding 104 in the bobbin 105 is surrounded by the remaining stator form 100 and bonded magnetic pole pieces 112.

Figure 7:
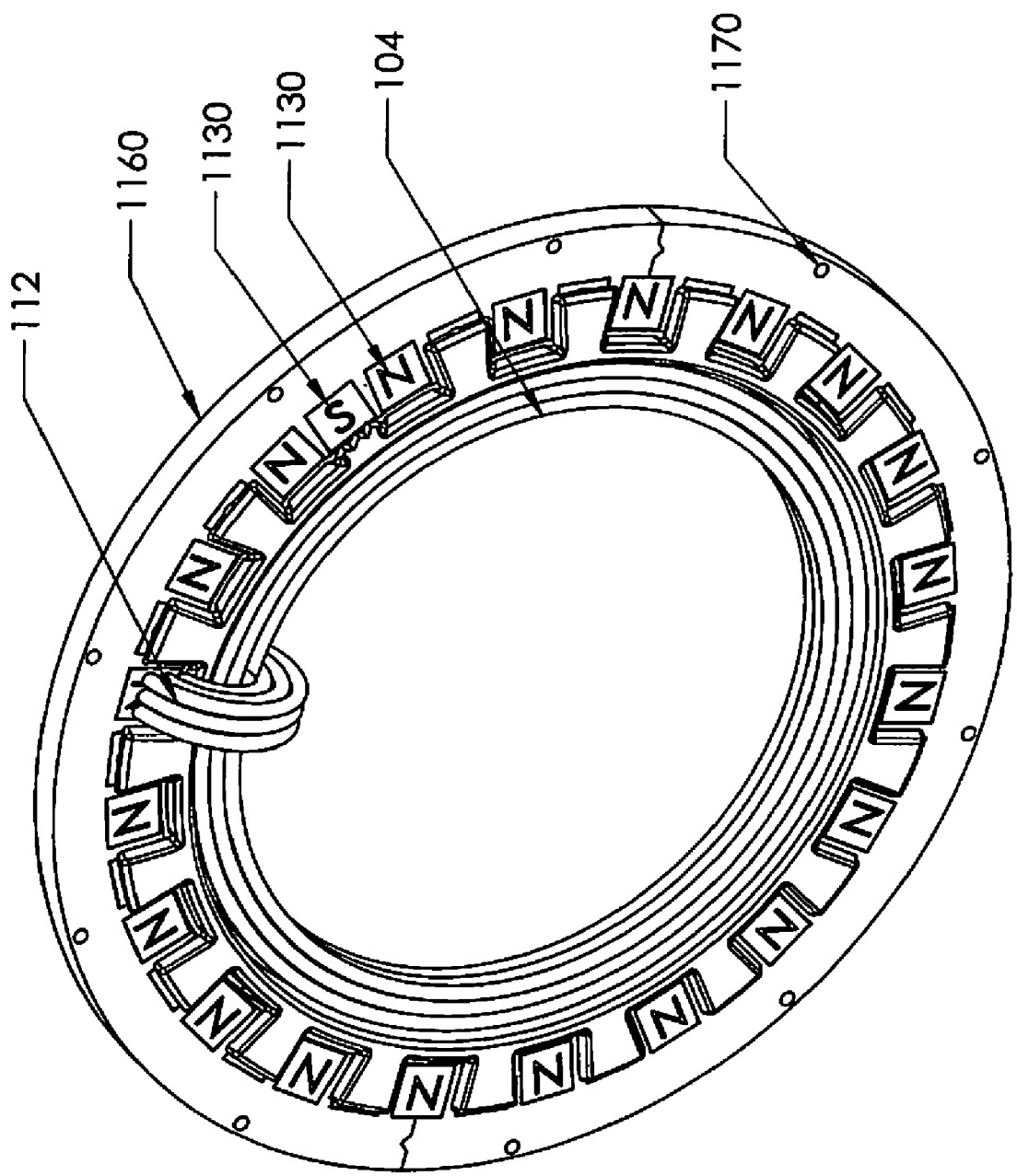
FIG. 7 shows an isolated rotor disk assembly showing the relationship between the bonded magnets, wound magnetic flux channel pole pieces and one transverse wound stator winding.

As described, the electric motor or generator of a preferred embodiment of the present invention includes a transverse wound stator produced using an inert pole spacer form 100 (FIG. 6), a transverse coil winding 104 wound on a coil winding bobbin 105, and wound magnetic flux channels 106 wound of layers of strands of insulated soft iron wire or amorphous alloy tape or wire, in which the wound magnetic flux channels are shaped to enclose the transverse winding to capture substantially all of the flux emitting from the transverse coil winding, and focusing that captured magnetic flux to the pole piece surfaces 112 of the wound magnetic flux channel 106, so that the flux maximally interacts with the permanent magnets in the moveable magnet ring shown in FIG. 7 which drives the rotor of the motor/generator.

Figure 8:
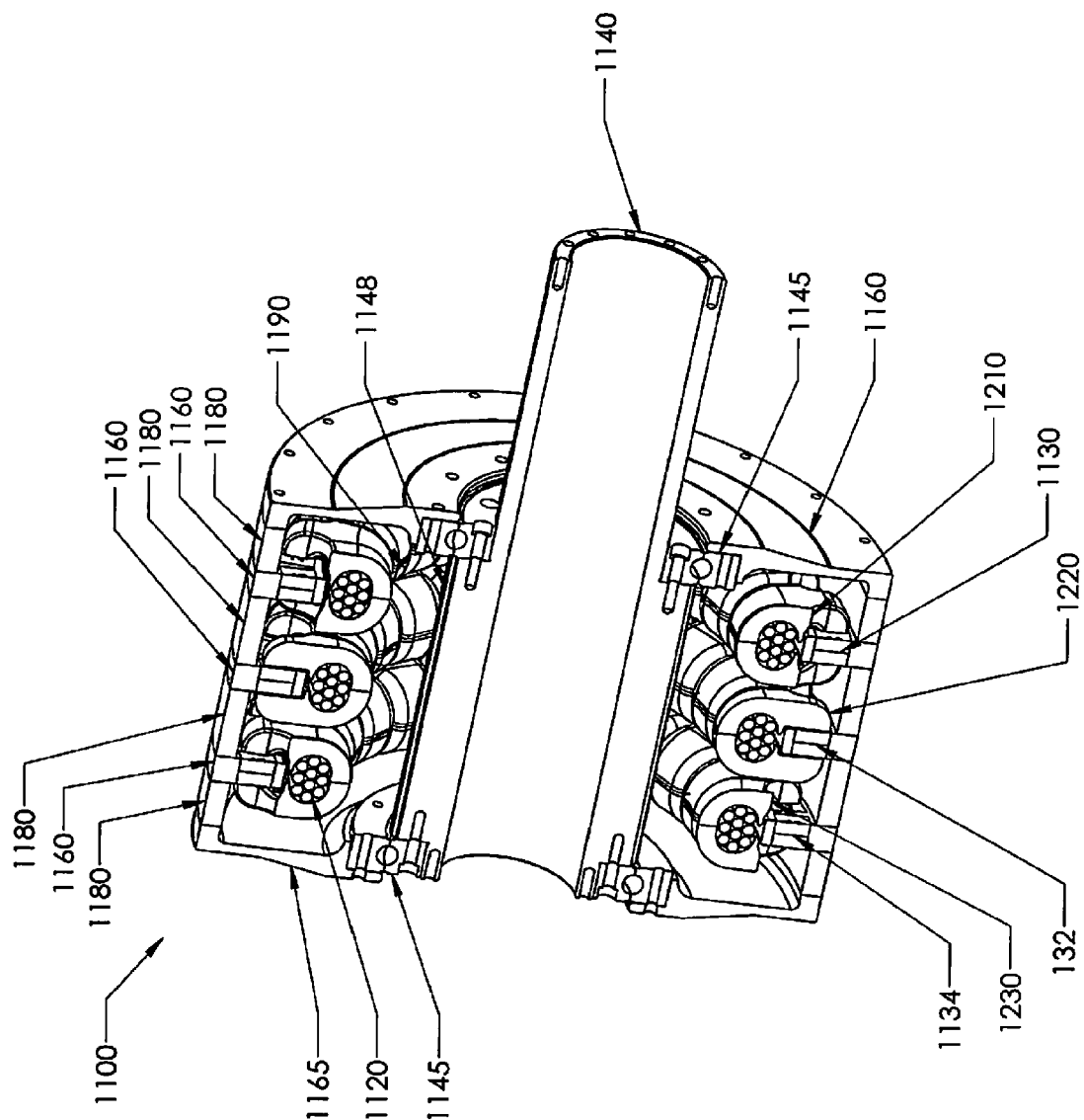
FIG. 8 is a perspective side view of mating molded magnetic flux channel pole pieces.

In a second preferred embodiment, the bicycle hub motor 1100 is a molded magnetic flux channel direct drive motor/generator as described in U.S. patent application Ser. No. 12/486,957 filed on Jun. 18, 2009, now U.S. Pat. No. 7,868,510, having the same inventor as the present application, which is incorporated herein by reference. FIG. 8 is a cross sectional perspective view of the bicycle hub motor according to this embodiment of the invention. The parallel pole motor includes three rotor discs 1160 separated by rotor spacers 1180. The motor includes a permanent magnet 1130 located between internal pole flat surfaces of pole pieces 1210 and a transverse wound stator winding 1120 running through the channel formed by plural adjacent pole pairs 1210, 1220 and 1230. The void area between the mated molded magnetic flux channel pole pieces and the shaft can be filled with an epoxy 1190 or other suitable material as shown in FIG. 8. The rotor uses rotating end plates 1165 with end bearings 1145 around the non-rotating shaft assembly 1140.

Figure 9:
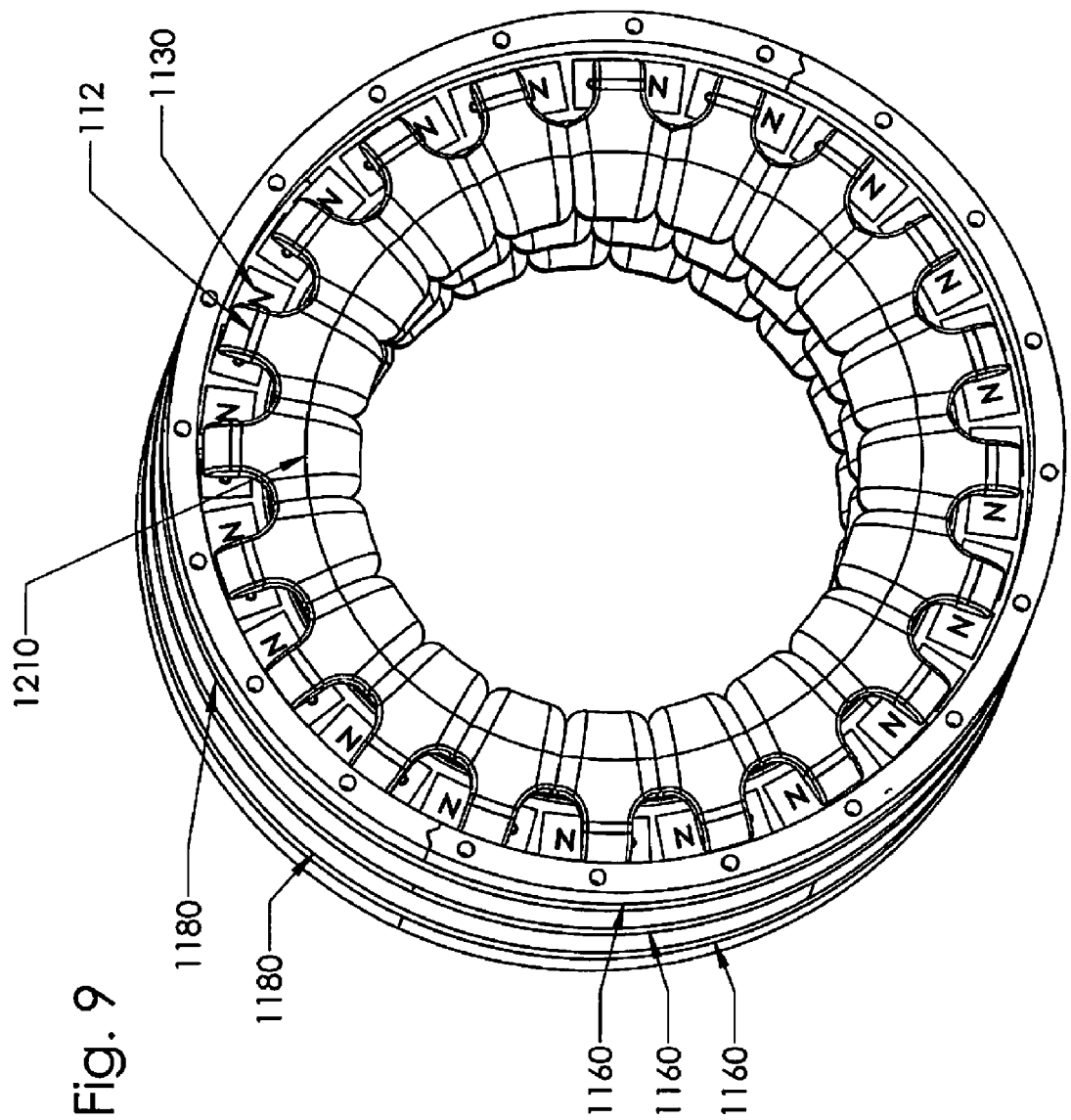
FIG. 9 shows a partial assembly including three stator assemblies, three rotor discs and two spacers with an electrical offset of approximately 120 electrical degrees.

FIG. 9 is a perspective side view of the isolated rotor disks 1160 assembly separated by spacers 1180 showing the relationship between the bonded magnets 1130 and one pair of mating molded magnetic flux channel pole pieces 112. The permanent magnets 1130 are flush mounted and bonded into slots which can be abrasive water jet machined into a plastic or composite material rotor discs. The plural permanent magnets 1130 can be bonded in place within the rotor disc 1160, alternating in polarity between north and south, with each permanent magnet separated from adjacent permanent magnets by a distance.

The spacing of the permanent magnets is increased to at least approximately 1.25 times the swept width of the magnet in order to reduce fringing losses. Although not shown, it is understood that each permanent magnet has a north end and a south end. In the preferred embodiment, the north and south polarity ends of the permanent magnets alternate around each side of the rotor disc 1160 with one end of the permanent magnets 1130 exposed on each side of the rotor disc 1160.

The rotor disc can also include alignment and or fastener holes closer to the outer circumference of the rotor. Functionally, FIGS. 8 and 9 show an example of a mated parallel pole magnetic flux pole piece 1210 with the transverse winding 1120 running through the channel. During rotation, each one of the mated pole pieces 1210 passes over opposite ends, thus opposite polarities, of the same permanent magnet 1130.

Figure 10:
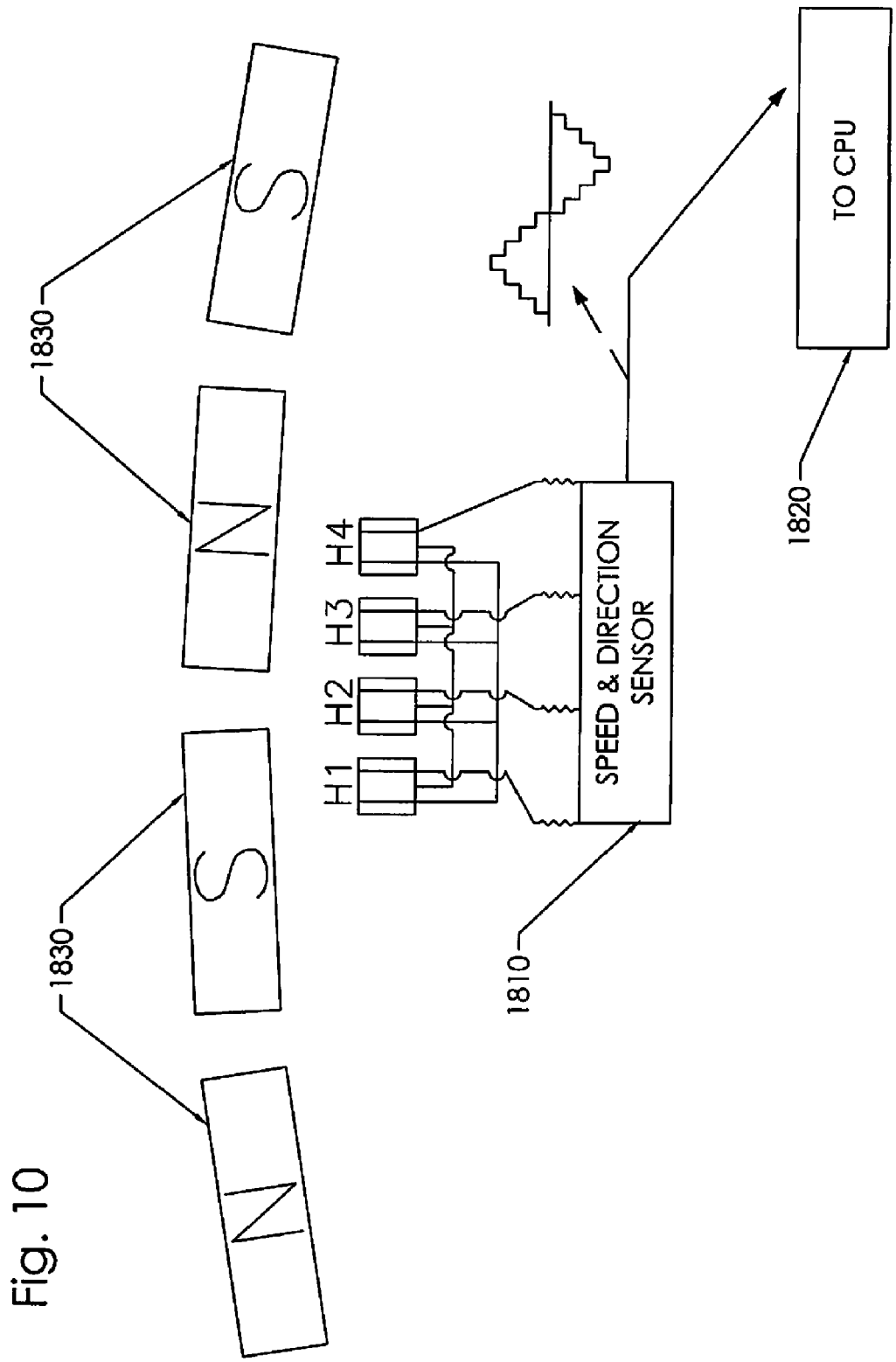
FIG. 10 shows a timing, direction and speed magnetic flux detector. In one embodiment, a plurality of detectors are positioned near the plane of the rotor magnets to accurately measure, the timing, speed and direction of movement of the rotor.

The driving electronics to drive the motor uses timing, direction and speed magnetic flux detectors. FIG. 10 shows an example of alternating permanent magnets 1830 and timing, direction and speed magnetic flux sensors 1810 that produce a signal corresponding to the detection for the electronic controller CPU 1820 according to a preferred embodiment of the present invention. Those skilled in the art of electronics will understand that alternative devices can be substituted for detecting the timing, speed and or direction of the rotor such as optical detectors. In a preferred embodiment, the magnetic detection module includes a plurality of ratiometric, balanced null Hall Effect sensors in close proximity to one another. In the example shown in FIGS. 10 and 11, four to sixteen individual sensors can be used although four are shown in FIG. 10, labeled as H1, H2, H3 and H4 for clarity.

As the magnetic field of a north pole magnet approaches the magnetic detection module 1810, sequentially each sensor's output changes from a midpoint voltage to a full positive voltage. The outputs are combined with summing resistors. As the sensors H1-H4 switch to full on, the first 90 degrees of the stair step sine wave shown in FIG. 10 is produced. As the magnetic field of the north pole magnet passes away from the module 1810, one by one the sensors H1-H4 switch to mid voltage again. This creates the second 90 degrees of the stair step sine wave. Then, as the adjacent south pole of the magnet approaches, each of the sensors H1-H4 is sequentially switched to zero voltage. This creates the third 90 degree portion of the stair step sine wave. And finally, as the south pole of the magnet moves away from the module 1810, each sensor H1-H4 is switched to mid voltage position, generating the final 90 degree portion of the stair step sine wave. The stair step sine wave output from each module is fed to the controller 1820 central processor unit (CPU), which provides accurate information of speed, direction and a choice of timing advance signals.

Figure 11:
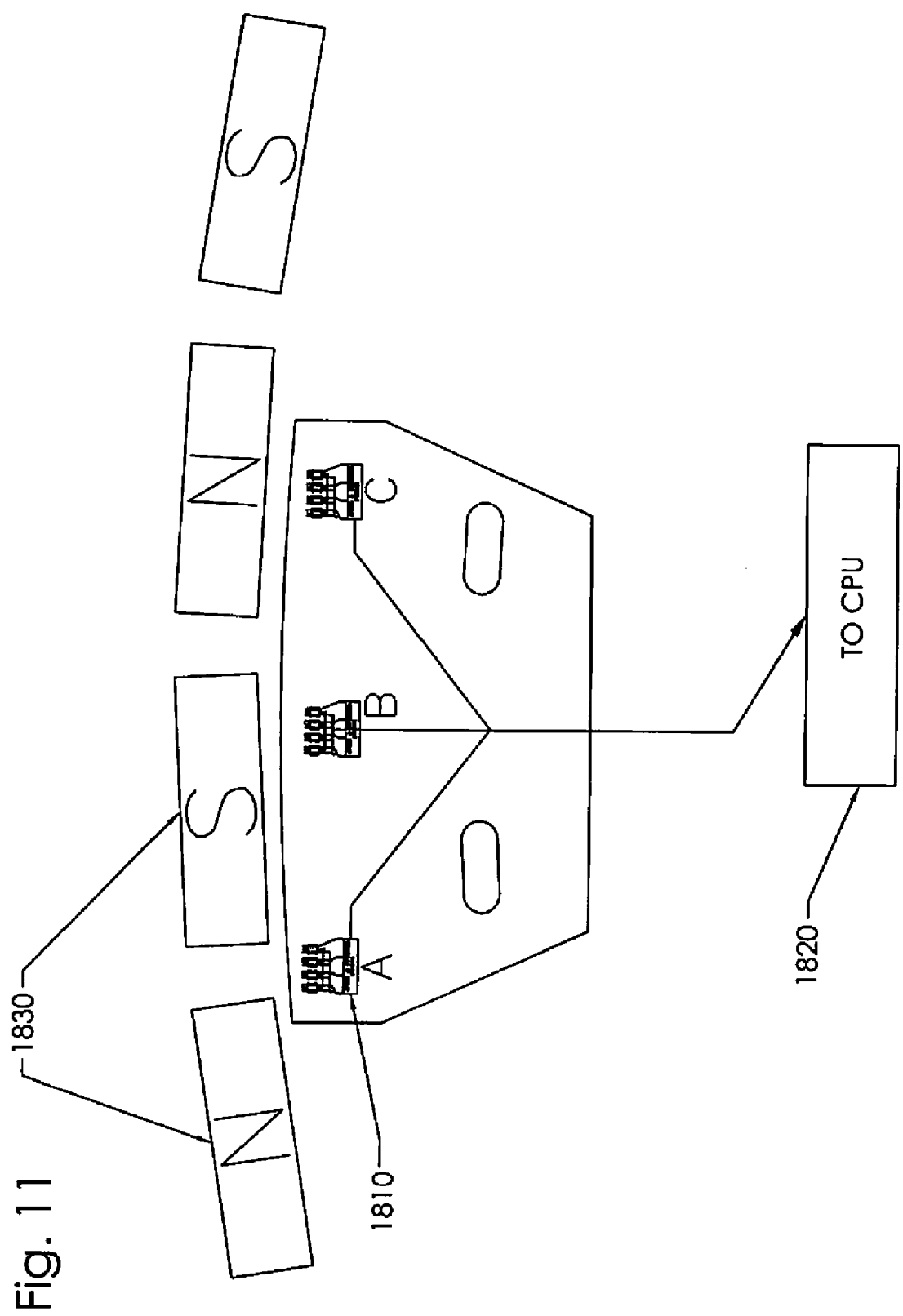
FIG. 11 shows three timing, direction and speed magnetic flux detectors positioned at approximately 120 electrical degree spacing and mounted on a moveable plate to allow for manual timing adjustments.

In the embodiment shown in FIG. 11, a plurality of the timing, direction and speed magnetic flux detectors 1810 are positioned near the plane of the rotor magnets 1830 to accurately measure the timing, speed and direction of movement of the rotor to determine feedback data for "on-the-fly" corrections. FIG. 11 shows three timing, direction and speed magnetic flux detectors positioned at approximately 120 electrical degree spacing and mounted on a moveable plate to also allow for manual timing adjustments.

Figure 12:
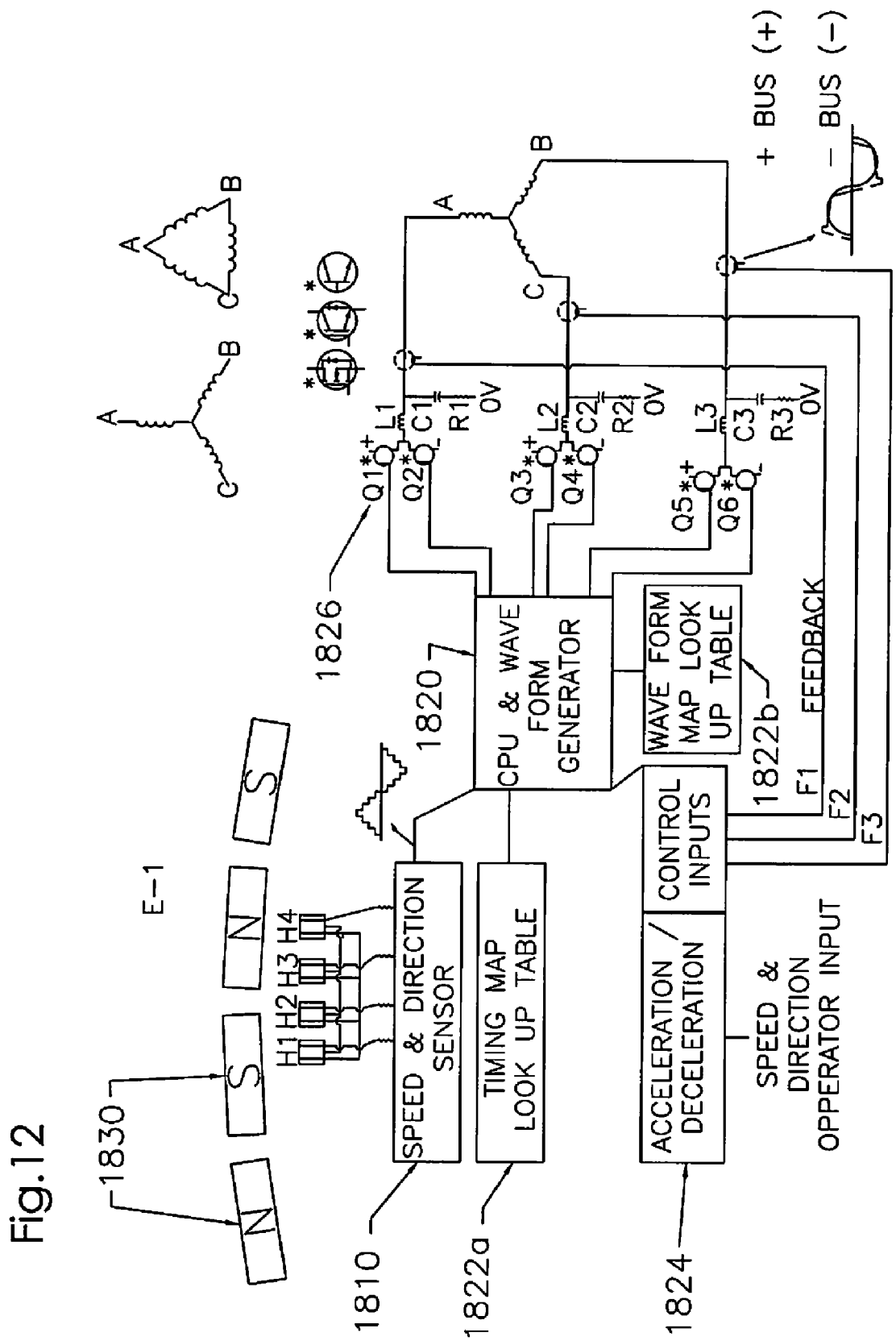
FIG. 12 is a block diagram of the electronic control of the motor with the stator windings in a Wye or Delta configuration.

The detected data is transmitted to the central processing unit within the controller 1820 for processing to determine the timing and optimal voltage waveform to be applied to the motor for the desired speed and power during operation. As previous described, a database containing optimal timing and waveform data corresponding to desired operation is stored in nonvolatile memory as a timing map lookup table 1822*a* and a waveform map look up table 1822*b* as shown in FIG. 12. The detector data can be used to compare the detected data with the stored optional voltage and waveform data for compensation or feedback data for "on-the-fly" corrections.

Referring to FIG. 12, the controller's 1820 central processing unit also receives input signals from the speed and direction user controls, the magnetic motion detectors, the current feedback sensors and other safety sensors. The central processing unit is coupled with a digitally stored data look up table 1822*a* and 1822*b*. The waveform look up table 1822*b* contains a selection of optimal waveforms, digitally stored, for various speed, direction, and power ranges. The acceleration/deceleration table 1824 contains digitally stored, optimal rates for increasing or decreasing speeds. The timing look up table 1822*a* contains, digitally stored, optimal timing advance values for various speeds, accelerations, and power levels. The waveform lookup table can be stored in flash memory and be updateable.

After determining the desired speed, direction, and acceleration for the motor, the CPU downloads the optimal waveform and timing required, and generates the plurality of phase signals to drive the switching transistors 1826 with an appropriate pulse width modulated waveform. This waveform is appropriate for the RPM and power level selected by the operator input device. The switching transistors 1826 may be Silicon Carbide MOSFETS, IGBT's, GaS, or other commercially available devices. In one embodiment, Silicon Carbide MOSFET's are preferred so that higher switching frequencies may be used, in addition to the lower switching losses for this device. The higher switching frequencies also enable more effective high frequency filtering.

Figure 13:
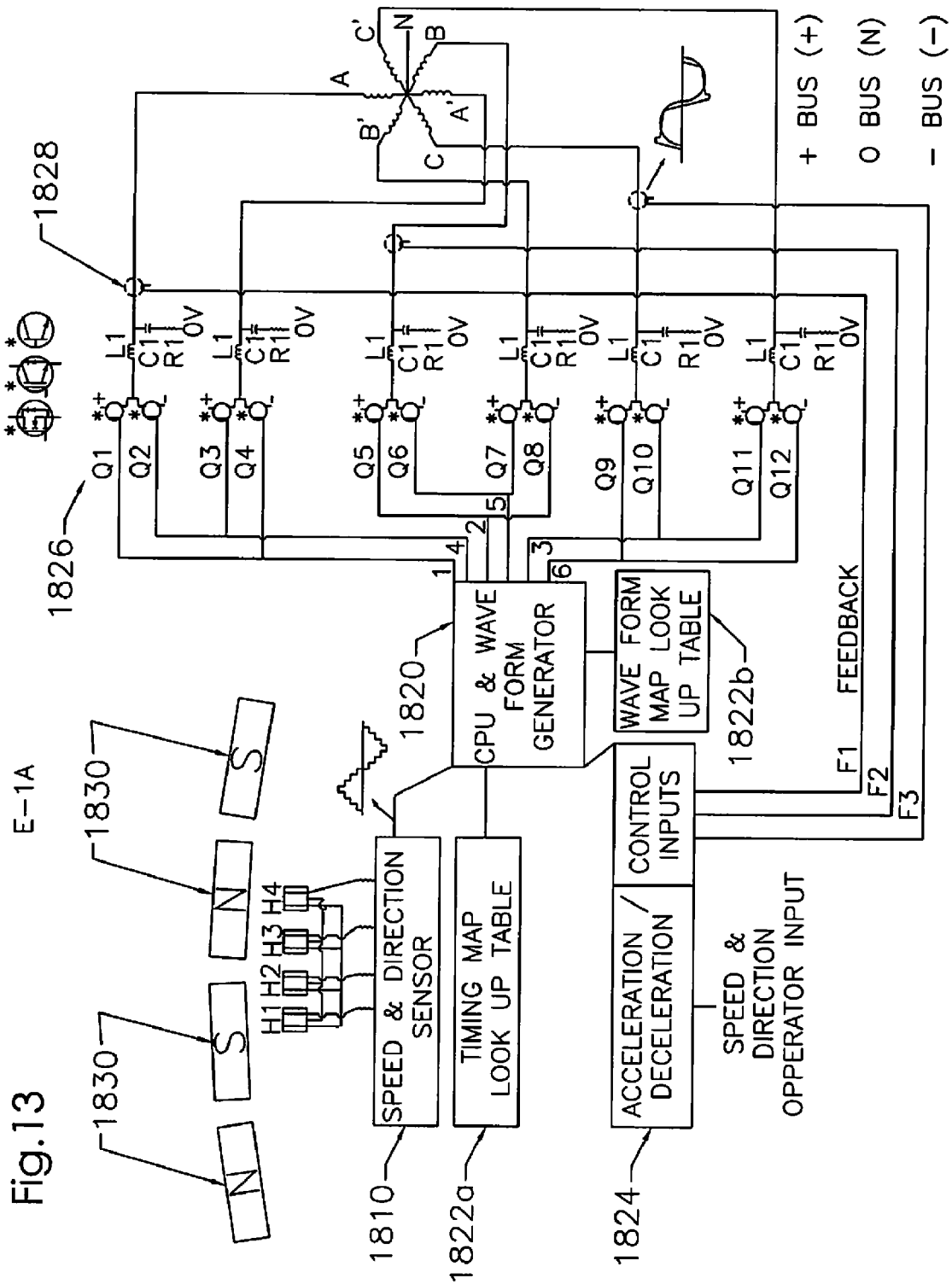
FIG. 13 is a block diagram of the electronic control of the motor with the stator windings in a STAR configuration.

The electronic control of the motor is quite different than conventional ones. The Motor may be connected in Wye, Delta or Star arrangement. Wye or Delta connections can be driven by the same electronic arrangement, and Star requires a different arrangement. FIG. 12 is a schematic block diagram of the electronic control of the motor with the stator windings in a Wye or Delta configuration. FIG. 13 is a schematic block diagram of the electronic control of the motor with the stator windings in a STAR configuration.

Figure 14:
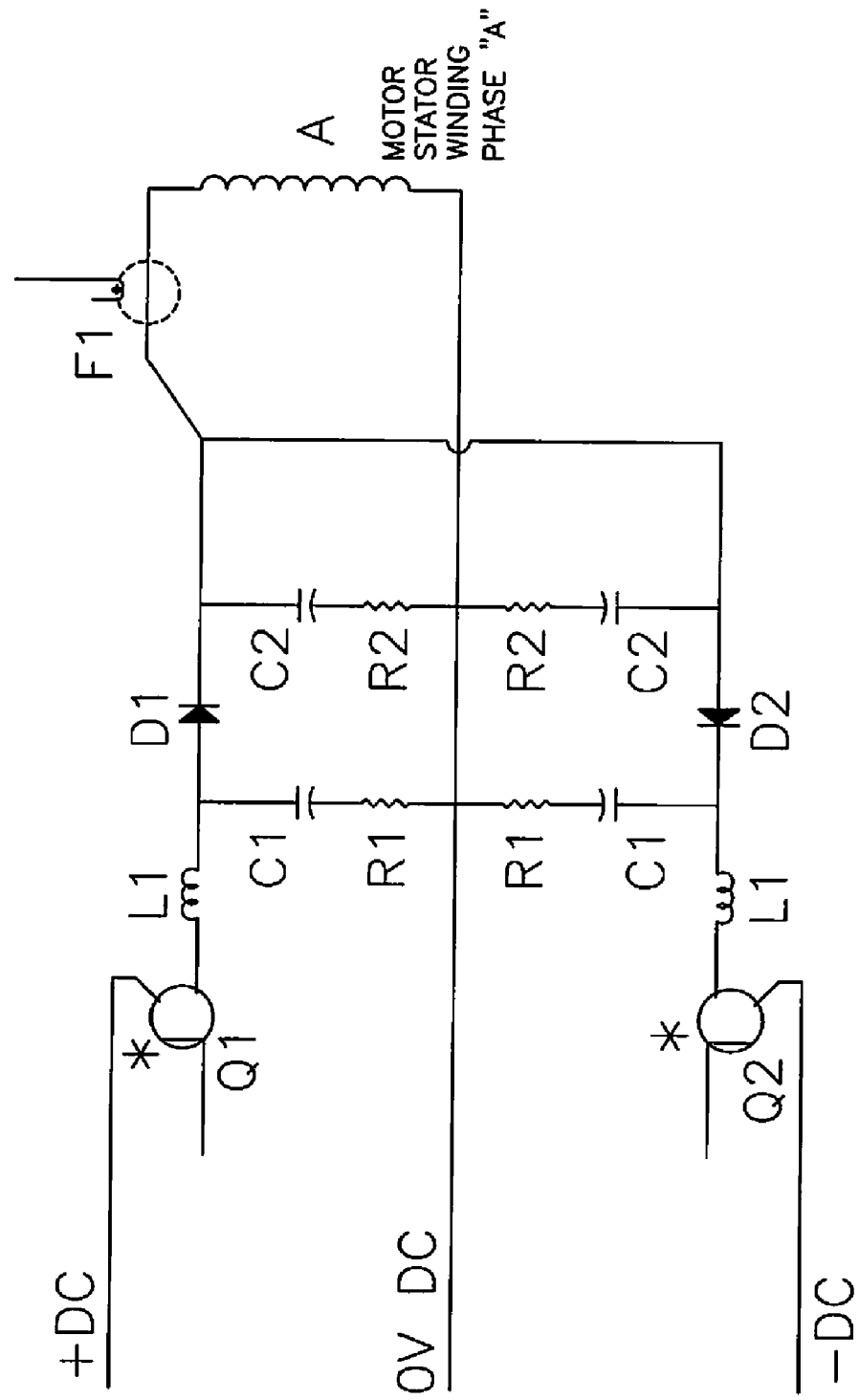
FIG. 14 is a block diagram of one output stage when the motor with the stator windings are configured in star configuration.

As shown in FIGS. 14 and 15, an LRC filter 1828 can be fitted to the outputs of the switching transistors 1826 to remove harmful switching AC noise prior to the output waveform being fed to the stator coils of the motor. This reduces degradation of the magnetization saturation characteristics of the molded magnetic flux channel pole pieces, reduces hysteresis losses in the magnetic materials increases torque and efficiency. Motors connected in either Wye or Delta configuration can be driven from electronics using six switching transistor circuits as shown in FIG. 12, while motors connected in Star configuration require additional components as shown in FIG. 13. Circuitry is similar except for additional transistor switches, and a power supply having an positive, negative source and neutral voltage supply.

After filtering, the outputs of the switching transistors are fed to the appropriate motor Stator Windings. Feedback is provided to the CPU by current and waveform detection modules 1810 which can be either Hall effect devices or current transformers. Current and waveform feedback are used to modify the driver outputs of the CPU to allow for current limiting, waveform repair, switching transistor temperature limiting, short circuit limiting, and other typical safety limitations.

In the star configured embodiment shown in FIG. 13, where a higher speed motor operation is required, an over running fly-forward diode is placed in series with each power semiconductor switch so as to allow the motor's top speed reverse EMF to greatly exceed the available driving power supply voltage. In this embodiment, the conduction waveform of each power semiconductor is restricted to that portion of the cycle in which the power supply voltage exceeds the reverse EMF of the stator winding. Above that voltage, the over running fly-forward diode allows the remainder of the increasing voltage waveform to free wheel in disengaged mode. With the power semiconductor switches and series connected over-running fly-forward diodes in the driving electronics the driving voltage waveform powers the stator coil from zero to the maximum available from its power supply and which allows the waveform voltage to continue to rise above available voltage in free-wheel fly-forward mode.

In an embodiment, the power semiconductor switches feeding their respective stator windings are switched on and off one pulse for each half electrical cycle, feeding the appropriate voltage waveform to each individual phase winding from the output of a series voltage regulator. When power semiconductor switches feeding their respective stator windings are switched on and off one pulse for each half electrical cycle, the pulse and duration can be varied to control the motor speed and torque.

The over-running fly forward diodes also permit higher efficiencies because reverse conduction is blocked, this eliminating otherwise wasted energy; hysteresis losses from high frequency switching is more easily filtered out and therefore less heat is transferred into the stator windings and the magnetic circuit; and only DC or pulsating DC is furnished to the stator windings, at the appropriate timing of polarity, while the AC from pulse width modulation PWM is rectified and filtered, thus producing more torque with less heating.

The overrunning mode is applicable to embodiments such as highway operated wheel motors in which high cruising speeds trade higher speed for maximum torque, wherein at low speeds full torque is needed and available while not operating in over running mode.

FIG. 14 is a schematic diagram of one output stage when the motor with the stator windings are configured in Star configuration, showing the connection to one leg of the stator winding, with each positive and negative semiconductor switch Q1 and Q2 equipped with its series over running fly-forward diode D1 and D2 for an embodiment wherein the motor top speed must exceed the supply voltage available. The electronics of the output stages shown in FIG. 13 are duplicated three times to power a Wye (four wire) configuration stator winding, or are duplicated six times to power a Star (seven wire) configuration Stator. The two stage LRC filters (L1 and R1 C1 and R2 C2) on each side of the diodes D1 and D2 are also shown.

FIG. 15 shows an alternative embodiment of LRC filters that filter out the high frequency semiconductor switching frequency in an output circuit without the over-running fly-forward diodes.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An electrical assist bicycle comprising:
    a parallel pole direct drive motor mounted to a hub of a bicycle to provide electric motor assist, the parallel pole direct drive motor comprising:
        an outside rotor having a rotor disc with plural magnets having alternating polarities flush mounted into the rotor disc;
        an inside stator assembly having a ring of magnetic flux channel pole pieces corresponding to a phase of the motor attached with a housing for a transversely wound stator windings to capture and focus the magnetic flux emanating from the transverse winding and channel the magnetic flux to the ring of magnetic flux channel pole pieces; and
        a sensor for monitoring a timing, speed and direction and for producing a feedback signal;
    a rechargeable battery connected with the electric parallel pole direct drive motor; and
    an electronic controller mounted to the frame of the bicycle connected with the sensors and the rechargeable battery to measure and proportion electrical power to the motor, the parallel pole direct drive motor coupling the feedback signal to a processing unit for determining and adjusting a drive electronics for driving the transverse phase windings and generating an electrical energy to recharge the rechargeable battery.

2. The electrical assist bicycle of claim 1 wherein the ring of magnetic flux channel pole pieces comprises:
   a ring of wound wire magnetic flux channel pole pieces corresponding to a phase of the motor, each pole piece body having a u-shaped gap above the bobbin to receive the rotor disc and inserted magnets with a gap therebetween and cut to form the u-shaped gap to direct and focus the captured magnetic flux toward and delivering the captured magnetic flux to the flat, axial magnetic pole surfaces with parallel sides of the u-shaped gap, perpendicular magnetic lines of force emanating at the pole piece surfaces.

3. The electrical assist bicycle of claim 2 wherein the wound magnetic flux channel pole pieces comprise:
   plural layered strands of insulated wire or amorphous tape to carry flux away from the wound pole pieces.

4. The electrical assist bicycle of claim 1 wherein the ring of magnetic flux channel pole pieces comprises:
   a ring of plural molded magnetic flux channel pole pieces corresponding to a phase of the motor forming a hollow channel for housing a transversely wound stator winding to capture and focus the magnetic flux emanating from the transverse winding and channel to the plural pole pieces, each pole piece body having a u-shaped gap above the channel to receive the rotor disc and inserted magnets with a gap therebetween and formed with tapered exterior sides and radiused curves in the base of the u-shaped gap to direct and focus the captured magnetic flux toward and delivering it to the flat, axial magnetic pole surfaces with parallel sides of the u-shaped gap, perpendicular magnetic lines of force emanating at the pole piece surfaces.

5. The electrical assist bicycle of claim 4 wherein each one of the plural molded magnetic flux channel pole pieces comprises:
   two pole pieces mated to form the channel connected at the base of the channel and have an isolation gap above the channel and the u-shaped gap above the isolation gap.

6. The electrical assist bicycle of claim 1 wherein the rotor disc comprises:
   plural rotor discs separated by rotor disc spacers to form the outside rotor.

7. The electrical assist bicycle of claim 1 wherein the parallel pole direct drive motor has a standard bicycle axle width includes a component for spoke placement to allow installation on a standard bicycle.

8. The electrical assist bicycle of claim 1 wherein the sensor comprises:
   plural cascaded Hall effect sensors located near the path of the rotor permanent magnets to generate a stair step sine wave which conveys information on rotor speed, direction, and timing to the electronic controller, and for generating an output waveform for driving the parallel pole direct drive motor.

9. The electrical assist bicycle of claim 1 wherein the parallel pole direct drive motor includes side plates bonded to a magnet housing or magnet carriers to eliminate the need for internal fasteners.

10. The electrical assist bicycle of claim 9 wherein the side plates form a band around the parallel pole direct drive motor, the band holding the side plates in compression and drilled for installation of spokes to alleviate the need for through fasteners.

11. The electrical assist bicycle claim 1 wherein the parallel pole direct drive motor is mounted to a front wheel hub with flexible wiring routed through the steering head housing to electrically connect the parallel pole direct drive motor to the electronic controller.

12. The electrical assist bicycle claim 9 wherein one of the parallel pole direct drive motor side plates includes:
   a threaded flange to install a chain sprocket assembly or a belt pulley assembly.

13. The electrical assist bicycle of claim 1 wherein the stator assembly is used to recharge the battery when decelerating or riding downhill.

14. The electric assist bicycle of claim 1 wherein the rechargeable battery comprises:
   two or more cylindrical rechargable batteries stacked together for placement within at least one of a down tube a seat tube of the bicycle frame.

15. The electrical assist bicycle of claim 14 further comprising:
   a longitudinal spring to hold the cylindrical battery stack in contact with the interior wall of the down tube or seat tube to increase heat dissipation and reduce rattling.

16. The electric assist bicycle of claim 14 further comprising:
   a tubular housing to hold the stack of rechargable batteries.

17. The electric assist bicycle of claim 16 further comprising:
   a shrink wrap material wrapped around the stack of rechargeable batteries to insulate, protect and maintain the shape of the stack of rechargeable batteries.

18. The electrical assist bicycle of claim 1 further comprising:
   a strain gauge connected to a bicycle crank arm housing to measure a rider pedaling effort.

19. The electric assist bicycle of claim 18 further comprising:
   a waterproof, flexible plug cover for the battery access port to permit controlled flexing of the crank arm housing for the strain gauge to measure a rider pedaling effort.

20. The electric assist bicycle of claim 1 further comprising:
   an electrical plug in the controller electronics for attaching a battery charger to recharge the rechargeable batteries.

21. The electrical assist bicycle of claim 2 wherein the wire wound flux channels are potted in a prepreg high temperature epoxy.

22. An electrical assist bicycle comprising:
   a parallel pole direct drive motor mounted to a hub of a bicycle to provide electric motor assist, the parallel pole direct drive motor comprising:
      an outside rotor having a rotor disc with plural magnets having alternating polarities flush mounted into the rotor disc;
      an inside stator assembly having a ring of magnetic flux channel pole pieces corresponding to a phase of the motor attached with a housing for a transversely wound stator windings to capture and focus the magnetic flux emanating from the transverse winding and channel the magnetic flux to the ring of magnetic flux channel pole pieces; and
      a sensor for monitoring a timing, speed and direction and for producing a feedback signal;
   a rechargeable battery connected with the electric parallel pole direct drive motor, the rechargeable battery including two or more cylindrical rechargable batteries stacked together for placement within at least one of a down tube and a seat tube of the bicycle frame;

an electronic controller mounted to the frame of the bicycle connected with the sensors and the rechargeable battery to measure and proportion electrical power to the motor, the parallel pole direct drive motor coupling the feedback signal to a processing unit for determining and adjusting a drive electronics for driving the transverse phase windings and generating an electrical energy to recharge the rechargeable battery; and a battery terminal lead connected at one end with the stack of rechargeable batteries and routed through the crank arm housing to the electronic controller to minimize connective losses and to improve the appearance of the bicycle.

23. The electric assist bicycle of claim 22 further comprising:

a battery access port in the bicycle crank arm housing for installing and removing the stack of rechargeable batteries.

24. The electric assist bicycle of claim 23 further comprising:

weatherproof access covers for the crank arm housing.

25. The electrical assist bicycle of claim 21 further comprising:

a longitudinal spring to hold the cylindrical battery stack in contact with the interior wall of the down tube or seat tube to increase heat dissipation and reduce rattling.

26. The electric assist bicycle of claim 21 further comprising:

a tubular housing to hold the stack of rechargeable batteries.

27. The electric assist bicycle of claim 26 further comprising:

a shrink wrap material wrapped around the stack of rechargeable batteries to insulate, protect and maintain the shape of the stack of rechargeable batteries.

* * * * *